US012634434B2

(12) United States Patent
Lin et al.

(10) Patent No.: US 12,634,434 B2
(45) Date of Patent: May 19, 2026

(54) MULTIPLE MODES AND MULTIPLE TEMPLATES FOR TEMPLATE MATCHING RELATED VIDEO CODING TOOLS

(71) Applicant: QUALCOMM Incorporated, San Diego, CA (US)

(72) Inventors: Po-Han Lin, Taipei (TW); Jian-Liang Lin, Su'ao Township (TW); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 18/402,049

(22) Filed: Jan. 2, 2024

(65) Prior Publication Data

US 2024/0223748 A1     Jul. 4, 2024

Related U.S. Application Data

(60) Provisional application No. 63/478,475, filed on Jan. 4, 2023.

(51) Int. Cl.
H04N 19/105          (2014.01)
H04N 19/167          (2014.01)
(Continued)

(52) U.S. Cl.
CPC ......... H04N 19/105 (2014.11); H04N 19/167 (2014.11); H04N 19/176 (2014.11); H04N 19/521 (2014.11); H04N 19/70 (2014.11)

(58) Field of Classification Search
CPC .. H04N 19/105; H04N 19/167; H04N 19/176; H04N 19/521; H04N 19/70
See application file for complete search history.

(56) References Cited

U.S. PATENT DOCUMENTS

2022/0224915 A1*  7/2022  Wang .................... H04N 19/176
2022/0385939 A1* 12/2022  Li ......................... H04N 19/52
2025/0211763 A1*  6/2025  Ma ........................ H04N 19/102

FOREIGN PATENT DOCUMENTS

EP          1919223  A1     5/2008
EP          3139605  A1     3/2017
(Continued)

OTHER PUBLICATIONS

International Search Report and Written Opinion—PCT/US2024/010200—ISA/EPO—Jul. 23, 2024.
(Continued)

*Primary Examiner* — Jae N Noh
(74) *Attorney, Agent, or Firm* — Shumaker & Sieffert, P.A.

(57) ABSTRACT

A method of coding video data comprises: determining a template pattern from among a set of two or more template patterns; identifying a reference template based on a similarity of the reference template and a current template, wherein the reference template and the current template have a shape defined by the template pattern, the reference template includes previously reconstructed samples and the current template includes reference samples of a current block of a current picture of the video data; obtaining, based on the reference template, a prediction block for a current block of a current picture of the video data; and encoding or decoding the current block based on the prediction block.

33 Claims, 12 Drawing Sheets

(51) Int. Cl.
|       |               |            |
|-------|---------------|------------|
| *H04N 19/176* | (2014.01) |
| *H04N 19/513* | (2014.01) |
| *H04N 19/70*  | (2014.01) |

(56) References Cited

FOREIGN PATENT DOCUMENTS

| EP | 3139607 A1 | 3/2017 |
|----|------------|--------|
| WO | 2018127441 A1 | 7/2018 |
| WO | 2019228660 A1 | 12/2019 |

OTHER PUBLICATIONS

Bossen F., et al., "Guidelines for VVC Reference Software Development", Joint Video Experts Team (JVET) of ITU-T SG16 WP3 and ISO/IEC JTC1/SC29/WG11, 14th Meeting: Geneva, CH, Mar. 19-27, 2019, JVET-N1003, pp. 1-8.

Bross B., et al., "Versatile Video Coding Editorial Refinements on Draft 10", JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515, XP030293334, cited in the application section 9.3.3.2.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description for Versatile Video Coding and Test Model 4 (VTM 4)", 13th JVET Meeting, Oct. 9, 2019-Nov. 8, 2019, Marrakech, (The Joint Video Exploration Team of ISO/IEC JTC1/SC29/WG11 and ITU-T SG.16 WP3), No. JVET-M1002-v2, Mar. 19, 2019, No. m46628, XP030255391, XP030215567, pp. 1-62, section 2, 3.7, figure 1.

Chen Y., et al., "Description of SDR, HDR and 360° Video Coding Technology Proposal by Qualcomm and Technicolor—Low and High Complexity Versions", 10. JVET Meeting, Apr. 10, 2018-Apr. 20, 2018, San Diego, (The Joint Video Exploration Team of ISO/IEC JTC1/SC29/WG11 and ITU-T SG.16 ), No. JVET-J0021, Apr. 14, 2018, pp. 1-42, XP030248216, [retrieved on Apr. 14, 2018].

Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29, 27th Meeting, by teleconference, Jul. 13-22, 2022, Motion Picture Expert Group or ISO/IEC JTC1/SC29/WG11, No. m60618, Oct. 11, 2022, pp. 1-54, Section 3.8 with sub-sections.

Coban M., et al., "Algorithm Description of Enhanced Compression Model 7 (ECM 7)", JVET-AB2025, Joint Video Experts Team (JVET) of ITU-T SG 16 WP 3 and ISO/IEC JTC 1/SC 29, 28th Meeting, Mainz, DE, Oct. 20-28, 2022, 62 Pages, Dec. 22, 2022, XP030306363, paragraphs 3.1.5.1, 3.3.5, 03.4, paragraphs [3.1.14], 3.2.16-0020, figure 14.

Coban M., et al., "Algorithm Description of Enhanced Compression Model 8 (ECM 8)", Editors, JVET-AC2025, Joint Video Experts Team (JVET) of ITU-T SG 16 WP 3 and ISO/IEC JTC 1/SC 29 29th Meeting, by teleconference, Jan. 11-20, 2023, pp. 1-74.

Huo J., et al., "EE2-1.15a: Intra Template Matching (Intra TMP) Based on Linear Filter Model", Xidian University, JVET-AD0112-v3, Joint Video Experts Team (JVET) of ITU-T SG 16 WP 3 and ISO/IEC JTC 1/SC 29 30th Meeting, Antalya, TR, Apr. 21-28, 2023, pp. 1-3.

Huo J., et al., "EE2-1.16: A Fusion method of Intra Template Matching Prediction(Intra TMP)", Xidian University, JVET-AD0116-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.

Li X., et al., "EE2-1.12: Intra TMP with sub-pel Precision", Alibaba group, JVET-AD0125-v1, Joint Video Experts Team (JVET) of ITU-T SG 16 WP 3 and ISO/IEC JTC 1/SC 29 30th Meeting, Antalya, TR, Apr. 21-28, 2023, pp. 1-3.

LIN P-H., et al., "EE2-1.19: IntraTMP with Multiple Modes", Qualcomm Incorporated, JVET-AD0194-v2, Joint Video Experts Team (JVET) of ITU-T SG 16 WP 3 and ISO/IEC JTC 1/SC 29 30th Meeting: Antalya, TR, Apr. 21-28, 2023, pp. 1-6.

LIN P.H., et al., "Non-EE2: IntraTMP with Multiple Modes", Qualcomm Incorporated, JVET-AC0198-v3, Joint Video Experts Team (JVET) of ITU-T SG 16 WP 3 and ISO/IEC JTC 1/SC 29 29th Meeting, by teleconference, Jan. 11-20, 2023, pp. 1-4.

Ma Y., et al., "EE2-1.14c Combination Test of EE2-1.14a and EE2-1.14b", Xidian University, JVET-AD0075-v2, Joint Video Experts Team (JVET) of ITU-T SG 16 WP 3 and ISO/IEC JTC 1/SC 29 30th Meeting, Antalya, TR, Apr. 21-28, 2023, pp. 1-2.

Naser K., et al., "EE2: Intra Template Matching", InterDigital, JVET-V0130-v6, Joint Video Experts Team (JVET) of ITU-T SG 16 WP 3 and ISO/IEC JTC 1/SC 29 22nd Meeting, by teleconference, Apr. 20-28, 2021, pp. 1-7.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AB2024-v3, 28th Meeting: Mainz, DE, Oct. 20-28, 2022, pp. 1-20.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Wang F., et al., "EE2-1.10 Multi-Candidate IntraTMP", OPPO, JVET-AD0073-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.

Wang F., et al., "EE2-1.20i/j: Combination of IntraTMP Tests", OPPO, JVET-AD0086-v4, Joint Video Experts Team (JVET) of ITU-T SG 16 WP 3 and ISO/IEC JTC 1/SC 29 30th Meeting, Antalya, TR, Apr. 21-28, 2023, pp. 1-5.

Zhang L., et al., "EE2-1.11: Intra Template Matching Prediction Fusion", JVET-AD0072-v2, Joint Video Experts Team (JVET) of ITU-T SG 16 WP 3 and ISO/IEC JTC 1/SC 29, 30th Meeting, Apr. 21, 2023-Apr. 28, 2023, Antalya, TR, Apr. 17, 2023, pp. 1-5, XP030308662.

Partial International Search Report—PCT/US2024/010200—ISA/EPO—Apr. 12, 2024.

Turkan M et al: "Image Prediction Based on Neighbor-Embedding Methods", IEEE Transactions on Image Processing, USA, vol. 21, No. 4, Apr. 24, 2012, pp. 1885-1898, XP002674661, ISSN: 1057-7149, Second Paragraph of Section I, Last Paragraph of p. 1885, Point 1) in Right-hand Column of p. 1887, Sentence Bridging Left-hand and Right-hand Columns on p. 1894 Figures 2,3.

* cited by examiner

MULTIPLE MODES AND MULTIPLE TEMPLATES FOR TEMPLATE MATCHING RELATED VIDEO CODING TOOLS

This application claims the benefit of U.S. provisional patent application 63/478,475, filed Jan. 4, 2023, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for template matching in video coding. As described herein, a video coder (e.g., a video encoder or a video decoder) may determine a template pattern from among a set of two or more template patterns. The video coder may identify a reference template based on a similarity of the reference template and a current template. The reference template and the current template have a shape defined by the template pattern. The reference template includes previously reconstructed samples and the current template includes reference samples of a current block of a current picture of the video data. The video coder may obtain, based on the reference template, a prediction block for a current block of a current picture of the video data. The video coder may encode or decode the current block based on the prediction block.

As mentioned above, the techniques of this disclosure provide for multiple template patterns. The determination of a template pattern from among multiple template patterns may allow a video coder to identify more candidate prediction blocks, such as candidate prediction blocks resulting from applying fusion to multiple candidate prediction blocks. Identifying more candidate prediction blocks may result in better coding efficiency because the video coder may be more likely to identify a candidate prediction block resembling the current block if there are more candidate prediction blocks. When the candidate prediction block closely resembles the current block, the number of bits required to store residual data representing differences between the candidate prediction block and the current block may be less. Hence, encoded video data representing the video data may include fewer bits overall.

In one example, a method of coding video data comprises: determining a template pattern from among a set of two or more template patterns; identifying a reference template based on a similarity of the reference template and a current template, wherein the reference template and the current template have a shape defined by the template pattern, the reference template includes previously reconstructed samples and the current template includes reference samples of a current block of a current picture of the video data; obtaining, based on the reference template, a prediction block for a current block of a current picture of the video data; and encoding or decoding the current block based on the prediction block.

In another example, this disclosure describes a device for coding video data, the device comprising: a memory configured to store the video data; and one or more processors implemented in circuitry, the one or more processors configured to: determine a template pattern from among a set of two or more template patterns; identify a reference template based on a similarity of the reference template and a current template, wherein the reference template and the current template have a shape defined by the template pattern, the reference template includes previously reconstructed samples and the current template includes reference samples of a current block of a current picture of the video data; obtain, based on the reference template, a prediction block for the current block; and encode or decode the current block based on the prediction block.

In another example, this disclosure describes a computer-readable storage medium is encoded with instructions that, when executed, cause one or more processors to: determine a template pattern from among a set of two or more template patterns; identify a reference template based on a similarity of the reference template and a current template, wherein the reference template and the current template have a shape defined by the template pattern, the reference template includes previously reconstructed samples and the current template includes reference samples of a current block of a current picture of video data; obtain, based on the reference template, a prediction block for the current block; and encode or decode the current block based on the prediction block.

The details of one or more examples are set forth in the accompanying drawings and the description below. Other features, objects, and advantages will be apparent from the description, drawings, and claims.

DETAILED DESCRIPTION

In general, the use of template-matching coding tools involves identifying a "template" that includes a set of samples above a current block and left of the current block. A video coder (e.g., a video encoder or a video decoder) may then perform a search for a set of samples in a search region that best matches the samples in the template. In the case of an intra template matching coding tool, the search region is within the same picture as the current block. In the case of an inter template matching coding tool, the search region is within a reference picture different from the picture containing the current block. A prediction block may be a block within the search region that is below and right of the identified set of samples. The video coder may determine a motion vector (e.g., a refined motion vector) of the current block as a spatial displacement between the current block and the prediction block. Residual data may represent differences between the current block and the prediction block. The use of such template-matching coding tools may obviate the need for a video encoder to signal the motion vector to a video decoder because the video decoder may independently determine the motion vector in the same way as the video encoder. Thus, the use of template-matching coding tools may reduce the size of encoded video data.

Conventional template-matching coding tools only use one template pattern. In other words, the template only has one shape. Specifically, conventional template-matching coding tools only use a template pattern that includes samples above and left of the current block. However, in accordance with one or more techniques of this disclosure, multiple different template patterns may be used. The use of multiple template patterns may allow video encoders and video decoders to generate additional candidates from which the video encoder or video decoder may select when generating a prediction block. The presence of the additional candidates may further improve video compression performance.

Figure 1:
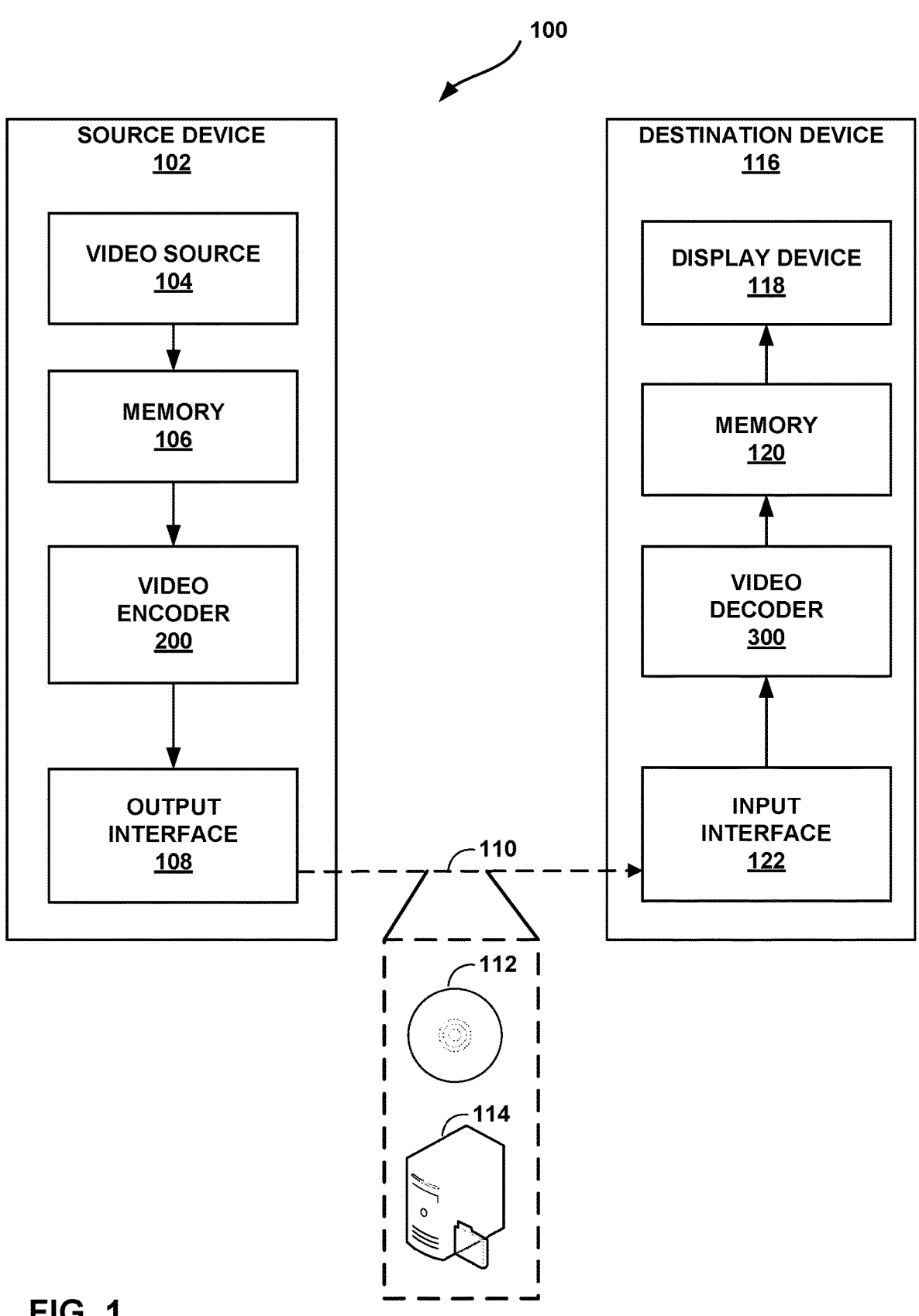
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the encoded video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for template-matching in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the template-matching techniques of this disclosure. Source device 102 and destination device 116 are merely examples of such coding devices in which source device 102 generates encoded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video data, and/or a video feed interface to receive video data from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, video encoder 200 and video decoder 300 may also include internal memories for functionally similar or equivalent purposes. Furthermore, memories 106, 120 may store encoded video data, e.g., output from video encoder 200 and input to video decoder 300, and/or unencoded video data. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored encoded video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template matching coding tools.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUS, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary trec (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUS having a height specified by syntax elements (e.g., such as in a picture parameter sct) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
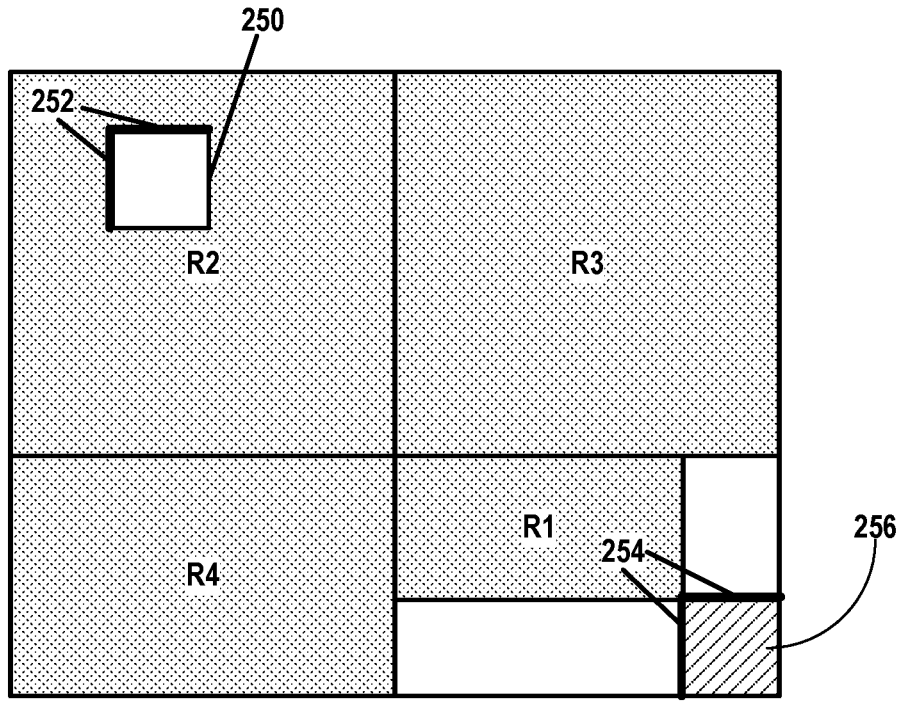
FIG. 2 is a block diagram illustrating an example intra template matching search area.

Intra template matching is now described. FIG. 2 is a block diagram illustrating an example intra template matching search area. Intra template matching prediction (Intra TMP) is a special intra prediction mode that copies a best prediction block 250 (e.g., a matching block from the reconstructed part of a current frame, whose L-shaped template (e.g., reference template 252) matches a current template 254. Current template 254 is a L-shaped set of samples above and left of a current block 256. Current block 256 may be a PU, CU, or other type of block. For a predefined search range, video encoder 200 searches for the most similar template to the current template 254 in a reconstructed part of the current frame and uses the corresponding block as prediction block 250. Video encoder 200 may then signal the usage of the intra template matching mode, and the same prediction operation is performed at video decoder 300.

A prediction signal is generated by matching an L-shaped causal neighbor of the current block (e.g., current template 254) with another block (e.g., prediction block 250) in a predefined search area. In the example of FIG. 2, the predefined search areas may consist of:

R1: current CTU
    R2: top-left CTU
    R3: above CTU
    R4: left CTU

Video encoder 200 and video decoder 300 may use a sum of absolute differences (SAD) as a cost function. In other words, as video encoder 200 and video decoder 300 search the search areas, video encoder 200 and video decoder 300 may position reference template 252 at different locations within the search areas. For each location, video encoder 200 and video decoder 300 may apply a cost function (e.g., SAD) to compare the samples in the reference template to the samples within current template 254. Video encoder 200 and video decoder 300 may select the location based on costs produced by the cost function for the different locations. Thus, within each region, video encoder 200 and video decoder 300 may search for the template that has least SAD with respect to the current one and uses its corresponding block as a prediction block.

The dimensions of all regions (SearchRange_w, SearchRange_h) may be set proportional to the block dimension (BlkW, BlkH) to have a fixed number of SAD comparisons per pixel. That is:

$$SearchRange\_w = a * BlkW$$

$$SearchRange\_h = a * BlkH$$

Where 'a' is a constant that controls the gain/complexity trade-off. In practice, 'a' is equal to 5.

In some examples, the intra template matching tool is enabled for CUs with size less than or equal to 64 in width and height. This maximum CU size for intra template matching may be configurable. The intra template matching prediction mode may be signaled at a CU level through a dedicated flag when decoder-side intra mode derivation (DIMD) is not used for the current CU.

Figure 3:
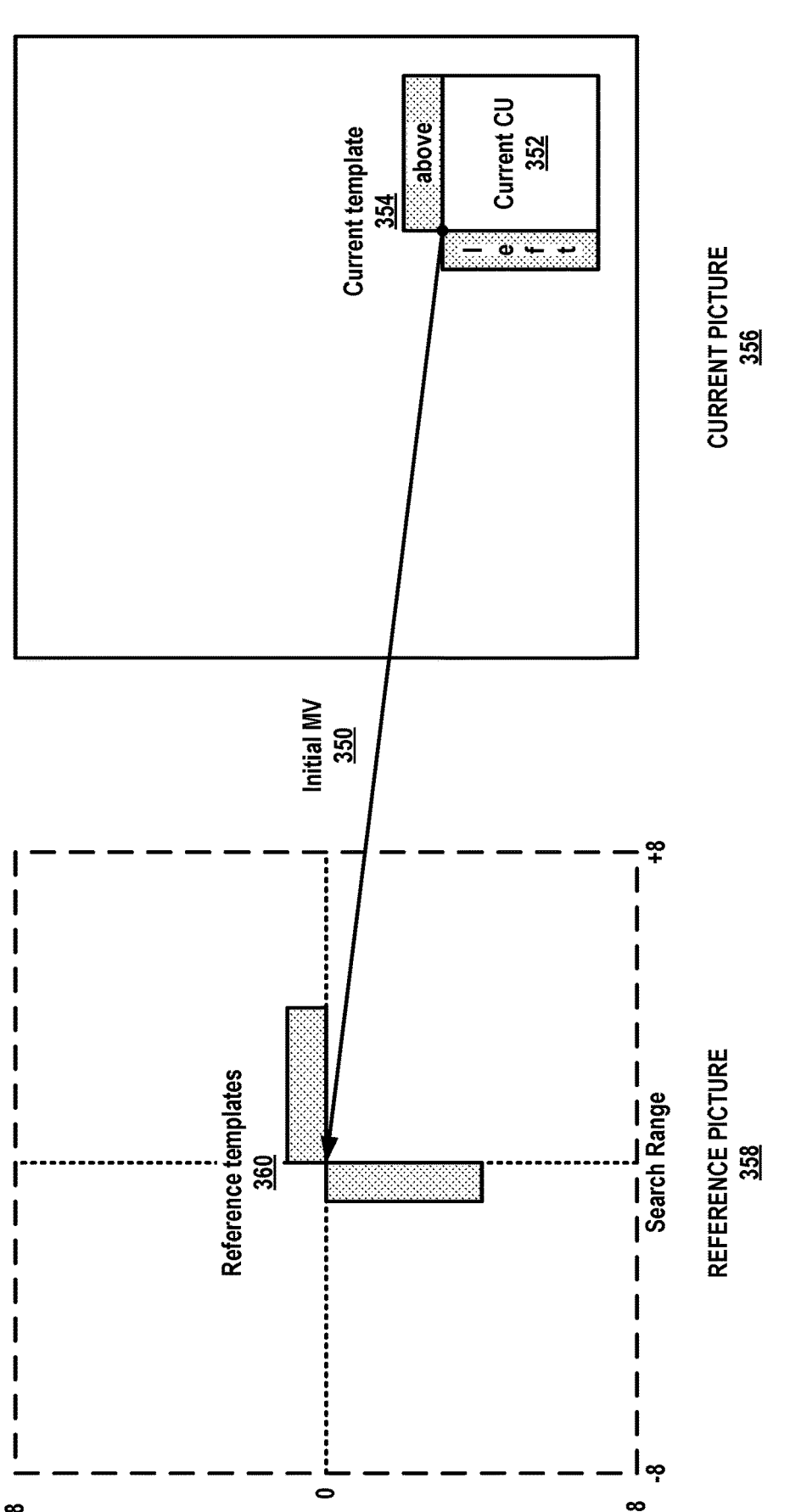
FIG. 3 is a block diagram illustrating an example of template matching performed on a search area around an initial motion vector.

Inter template matching is now discussed. FIG. 3 is a block diagram illustrating an example of template matching performed on a search area around an initial motion vector 350. Inter template matching (InterTM) is a decoder-side MV derivation method to refine the motion information of a current CU 352 by finding the closest match between a template 354 (i.e., top and/or left neighbouring blocks of current CU 352) in a current picture 356 and a block (i.e., a reference template 360 having same size as current template 354) in a reference picture 358. As illustrated in FIG. 3, a better MV is searched around the initial motion of current CU 352 within a [−8, +8]-pel search range. The template matching method in Chen et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, 10th Meeting: San Diego, US, 10-20 Apr. 2018, document JVET-J0021 (hereinafter, "JVET-J0021") is used with the following modifications: search step size is determined based on AMVR mode and InterTM can be cascaded with bilateral matching process in merge modes.

In AMVP mode, an MVP candidate is determined based on template matching error to select the one which reaches the minimum difference between current template 354 and a reference block template 360, and then InterTM is performed only for this particular MVP candidate for MV refinement. InterTM refines this MVP candidate, starting from full-pel MVD precision (or 4-pel for 4-pel AMVR mode) within a [−8, +8]-pel search range by using an iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1, below. This search process may ensure that the MVP candidate keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR

| Search pattern | AMVR mode | | | | Merge mode | |
| | 4-pel | Full-pel | Half-pel | Quarter-pel | AltIF = 0 | AltIF = 1 |
| --- | --- | --- | --- | --- | --- | --- |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, video encoder 200 and video decoder 300 may apply a similar search method to the merge candidate indicated by the merge index. As Table 1 shows, InterTM may perform all the way down to ⅛-pel MVD precision or skipping those beyond half-pel MVD precision, depending on whether the alternative interpolation filter (that is used when AMVR is of half-pel mode) is used according to merged motion information. When TM mode is enabled, template matching may work as an independent process or an extra MV refinement process between block-based and subblock-based bilateral matching (BM) methods, depending on whether BM can be enabled or not according to its enabling condition check.

Adaptive reordering of merge candidates with template matching (ARMC-TM) is now discussed. Video encoder 200 and video decoder 300 may adaptively reorder the merge candidates with template matching TM. Video encoder 200 and video encoder 300 may apply the reordering method to regular merge mode, TM merge mode, and affine merge mode (excluding the subblock temporal motion vector prediction (SbTMVP) candidate). For the TM merge mode, video encoder 200 and video decoder 300 may reorder merge candidates before the refinement process.

Video encoder 200 and video decoder 300 may firstly construct an initial merge candidate list according to given checking order, such as spatial, temporal motion vector predictors (TMVPs), non-adjacent, history-based motion vector predictors (HMVPs), pairwise, virtual merge candidates. Video encoder 200 and video decoder 300 may then divide the candidates in the initial list into several subgroups. For the template matching TM merge mode, adaptive decoder-side motion vector refinement (DMVR) mode, video encoder 200 and video decoder 300 may each firstly refine merge candidates in the initial list using TM/multi-pass DMVR. Video encoder 200 and video decoder 300 may reorder merge candidates in each subgroup to generate a reordered merge candidate list and the reordering is according to costs based on template matching. The index of selected merge candidate in the reordered merge candidate list is signaled to video decoder 300. For simplification, merge candidates in the last but not the first subgroup are not reordered. All the zero candidates from the ARMC reordering process are excluded during the construction of Merge motion vector candidates list. The subgroup size is set to 5 for regular merge mode and TM merge mode. The subgroup size is set to 3 for affine merge mode.

Video encoder 200 and video decoder 300 may measure the template matching cost of a merge candidate during the reordering process by the SAD between samples of a template of the current block and their corresponding reference samples. The template comprises a set of reconstructed samples neighboring to the current block. Reference samples of the template are located by the motion information of the merge candidate. When a merge candidate utilizes bi-directional prediction, the reference samples of the template of the merge candidate are also generated by bi-prediction as shown in FIG. 4.

Figure 4:
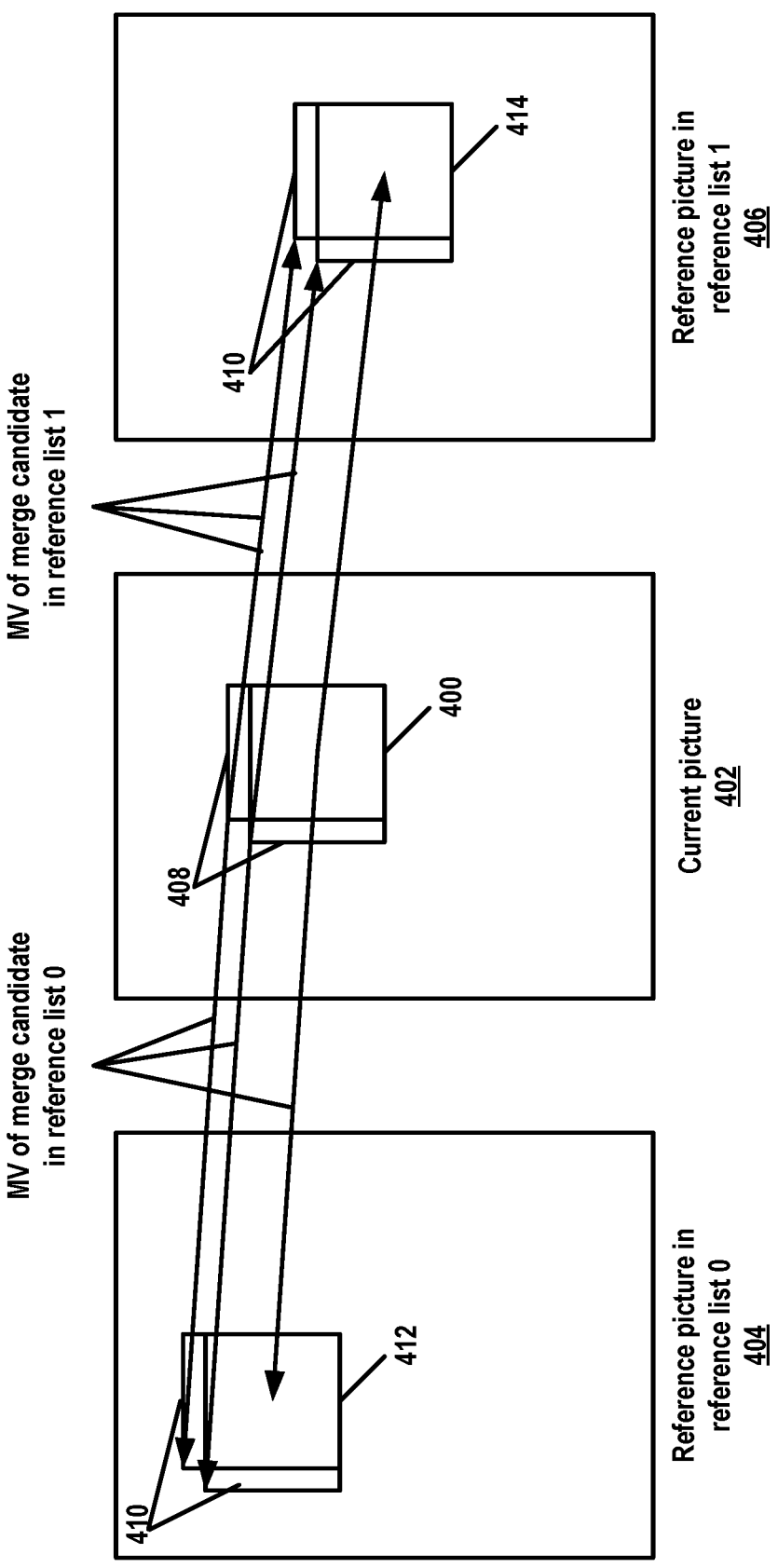
FIG. 4 is a conceptual diagram illustrating example template and reference samples of the template in reference pictures.

FIG. 4 is a conceptual diagram illustrating example template and reference samples of the template in reference pictures. As shown in the example of FIG. 4, a video coder (e.g., video encoder 200 or video decoder 300) is coding (e.g., encoding or decoding) a current block 400 of a current picture 402. Current block 400 is associated with a merge candidate list that includes one or more bi-prediction merge candidates. Each of the bi-prediction merge candidates includes a List 0 motion vector and a List 1 motion vector. The List 0 motion vector indicates a location within a reference picture in a first reference picture list (i.e., list 0). The List 1 motion vector indicates a location within a reference picture in a second reference picture list (i.e., list 1). In the example of FIG. 4, the List 0 motion vector of a selected merge candidate indicates a location in a reference picture 404. The List 1 motion vector of a selected merge candidate indicates a location in a reference picture 406. The video coder may then use a template 408 of current block 400 to search areas near indicated locations in reference picture 404 and reference picture 406 for templates 410 (i.e., reference samples of a template in reference list 0 and reference list 1). In this way, the video coder may be able to identify a reference block 412 and a reference block 414 that are potentially more similar to current block 400 than reference blocks at locations indicated by the List 0 motion vector and the List 1 motion vector.

Refinement of an initial merge candidate list is now discussed. When multi-pass DMVR is used to derive the refined motion to the initial merge candidate list only the first pass (i.e., PU level) of multi-pass DMVR is applied in reordering. When template matching is used to derive the refined motion, the template size is set equal to 1. Only the above template or left template is used during the motion refinement of TM when the block is flat with block width greater than 2 times of height or narrow with height greater than 2 times of width. TM is extended to perform $\frac{1}{16}$-pel MVD precision. The first four merge candidates are reordered with the refined motion in TM merge mode.

Figure 5:
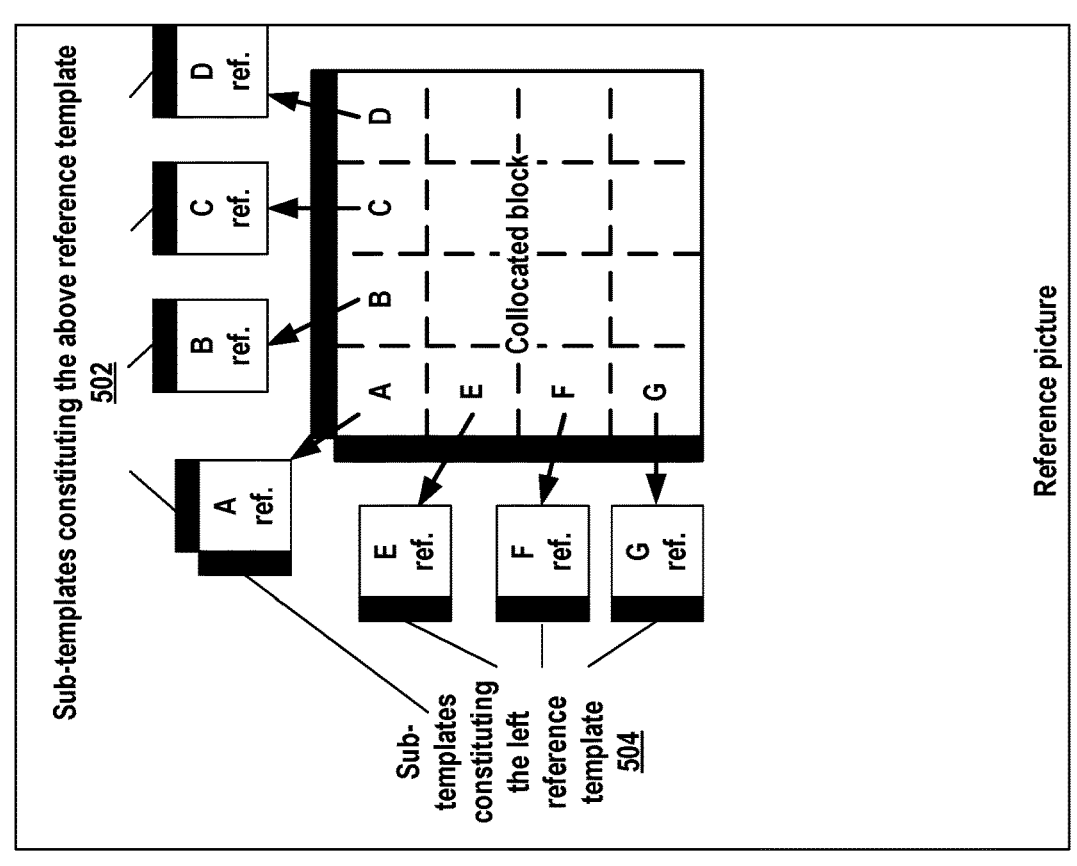
FIG. 5 is a conceptual diagram illustrating example template and reference samples of the template for block with sub-block motion using the motion information of the sub-blocks of the current block.
Figure 5:
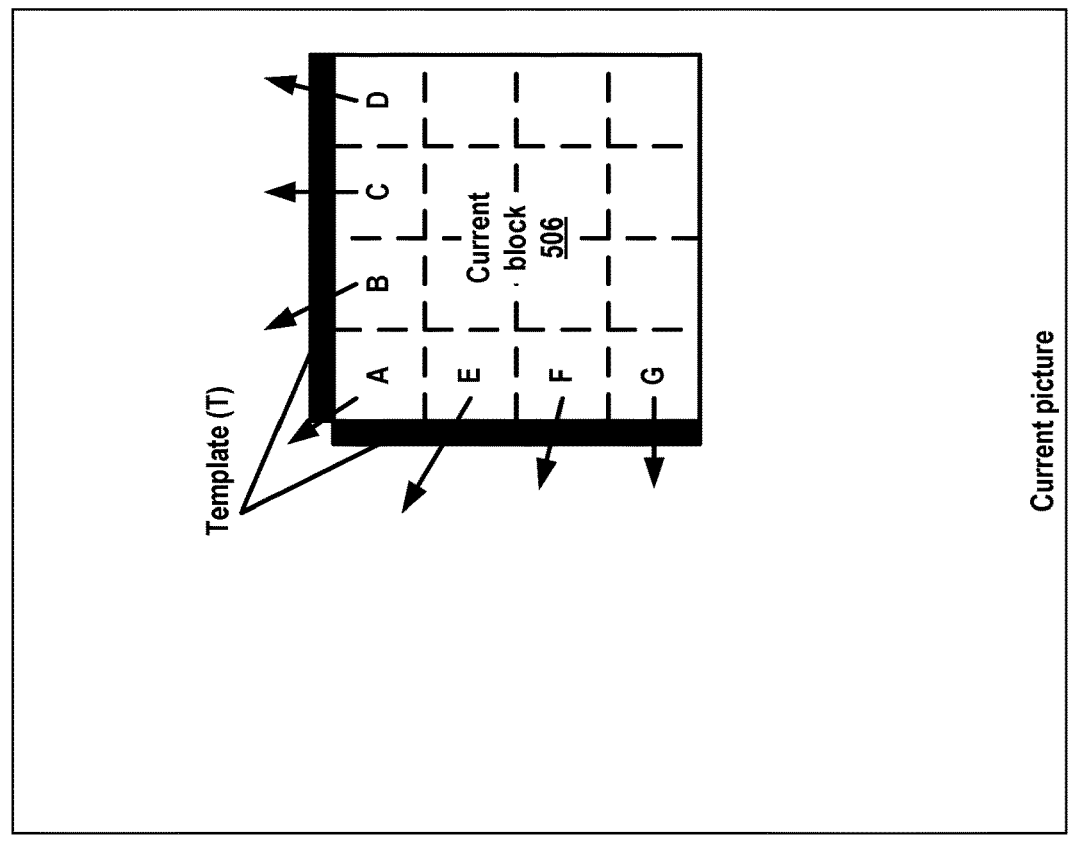
Figure 6A:
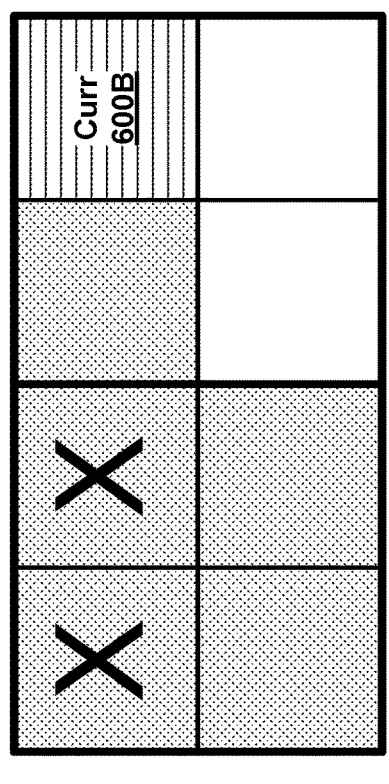
FIGS. 6A-6D are conceptual diagrams illustrating example intra block copy (IBC) reference regions depending on a current coding unit (CU) position.
Figure 6B:
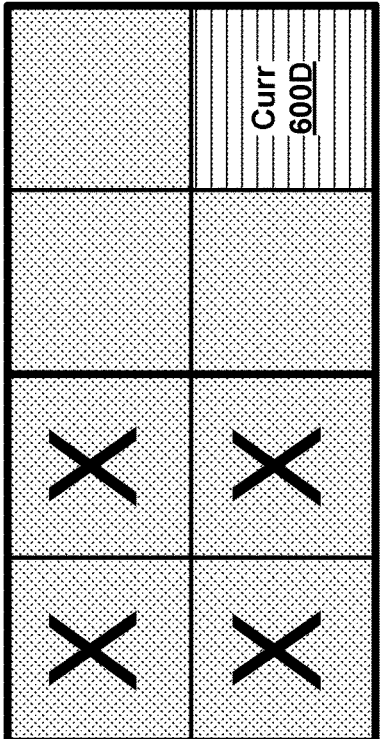
Figure 6C:
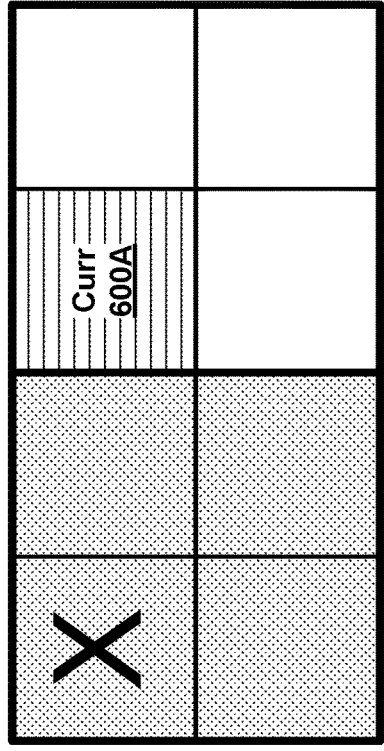
Figure 6D:
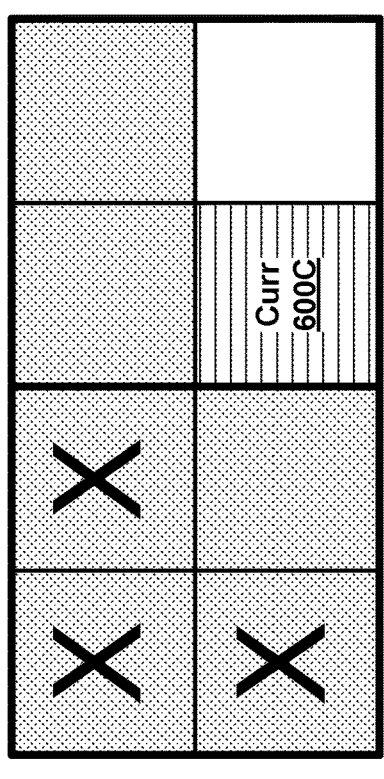

FIG. 5 is a conceptual diagram illustrating example template and reference samples of the template for block with sub-block motion using the motion information of the sub-blocks of the current block. For subblock-based merge candidates with subblock size equal to Wsub×Hsub, the above template comprises several sub-templates 502 with the size of Wsub×1, and the left template comprises several sub-templates 504 with the size of 1×Hsub. As shown in FIG. 5, the motion information of the subblocks in the first row and the first column (sub-blocks A-G) of current block 506 is used to derive the reference samples of each sub-template.

In the reordering process, video encoder 200 and video decoder 300 consider a candidate as redundant if the cost difference between a candidate and its predecessor is inferior to a lambda ($\lambda$) value e.g., $|D1-D2|<\lambda$, where D1 and D2 are the costs obtained during the first ARMC ordering and $\lambda$ is the Lagrangian parameter used in the RD criterion at encoder side.

An algorithm for the reordering process may be defined as follows:

Determine the minimum cost difference between a candidate and its predecessor among all candidates in the list.

If the minimum cost difference is superior or equal to $\lambda$, the list is considered diverse enough and the reordering stops.

If this minimum cost difference is inferior to $\lambda$, the candidate is considered as redundant and the candidate is moved at a further position in the list. This further position is the first position where the candidate is diverse enough compared to the candidate's predecessor.

The algorithm stops after a finite number of iterations (if the minimum cost difference is not inferior to $\lambda$)

This algorithm may be applied to the Regular, TM, BM and Affine merge modes. A similar algorithm may be applied to the Merge MMVD and sign MVD prediction methods which also use ARMC for the reordering.

The value of $\lambda$ may be set equal to the $\lambda$ of the rate distortion criterion used to select the best merge candidate at the encoder side for low delay configuration and to the value $\lambda$ corresponding to a another QP for Random Access configuration. A set of $\lambda$ values corresponding to each signaled QP offset is provided in the SPS or in the Slice Header for the QP offsets which are not present in the SPS.

The ARMC design is also applicable to the AMVP mode wherein video encoder 200 and video decoder 300 reorder the AMVP candidates according to the TM cost. For the template matching for advanced motion vector prediction (TM-AMVP) mode, an initial AMVP candidate list is constructed, followed by a refinement from TM to construct a refined AMVP candidate list. In addition, an MVP candidate with a TM cost larger than a threshold, which is equal to five times of the cost of the first MVP candidate, is skipped.

When wrap-around motion compensation is enabled, the MV candidate shall be clipped with wrap around offset taken into consideration.

Geometric partition mode (GPM) with template matching TM is now described. Template matching is applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 2. Video encoder 200 and video decoder 300 may then refine the motion by minimizing the difference between the current template and the template in the reference picture using the same search pattern of merge mode with half-pel interpolation filter disabled.

rate-distortion optimization (RDO) or decoding process. The IBC-TM merge mode has been put in competition with the regular IBC merge mode and a TM-merge flag is signaled.

In the IBC-TM AMVP mode, up to 3 candidates are selected from the IBC-TM merge list. Each of those 3 selected candidates are refined using the Template Matching method and sorted according to their resulting Template Matching cost. Only the 2 first ones are then considered in the motion estimation process as usual.

FIGS. 6A-6D are conceptual diagram illustrating example intra block copy (IBC) reference regions depending on a current coding unit (CU) position. In FIGS. 6A-6D, shaded blocks are "causal" with respect to a current block 600A, 600B, 600C, or 600D (collectively, "current blocks 600"). In other words, the shaded blocks are encoded or decoded prior to current blocks 600. Blocks marked with an "X" mark are

TABLE 2

Template for the 1st and 2nd geometric partitions, where A represents using above samples, L represents using left samples, and L + A represents using both left and above samples.

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |

| Partition angle | 16 | 18 | 19 | 20 | 21 | 24 | 27 | 28 | 29 | 30 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |

A GPM candidate list may be constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.

2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.

3. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

Intra block copy (IBC) with template matching is now described. Template Matching is used in IBC for both IBC merge mode and IBC AMVP mode. The IBC-TM merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU.

In the IBC-TM merge mode, the selected candidates are refined with the Template Matching method prior to the reference regions that can be used with respect to current blocks 600 for IBC-TM. The Template Matching refinement for both IBC-TM merge and AMVP modes is quite simple since IBC motion vectors are constrained (i) to be integer and (ii) within a reference region as shown in FIGS. 6A-6D. So, in IBC-TM merge mode, all refinements are performed at integer precision, and in IBC-TM AMVP mode, they are performed either at integer or 4-pel precision depending on the AMVR value. Such a refinement accesses only samples without interpolation. In both cases, the refined motion vectors and the used template in each refinement step must respect the constraint of the reference region.

To improve the coding efficiency of template matching, instead of using only one pattern and process of template in TM, template matching may use different template types, store more candidates, and apply fusion to combine these different candidates which are found by the different methods.

For description-wise simplicity, if not otherwise stated, the mentioned TM in this section can refer to the intra template matching, inter template matching, adaptive reordering of merge candidates with template matching (ARMC-TM) or IBC template matching. The disclosed methods can be used solely or in any combination.

Techniques for multiple TM modes by different template patterns are now described. In a first example technique, TM has a template pattern set comprised of multiple template matching patterns, and one or more syntax elements are signaled to indicate one template pattern used in the template matching process. When template matching is used in the current block and a template matching mode is signaled, video encoder 200 or video decoder 300 uses the corresponding template pattern of this mode in the template matching process. The template pattern is not constrained to use the adjacent neighboring samples of the current block.

Figures 7A, 7B, 7C, 7D, 7E, 7F, 7G:
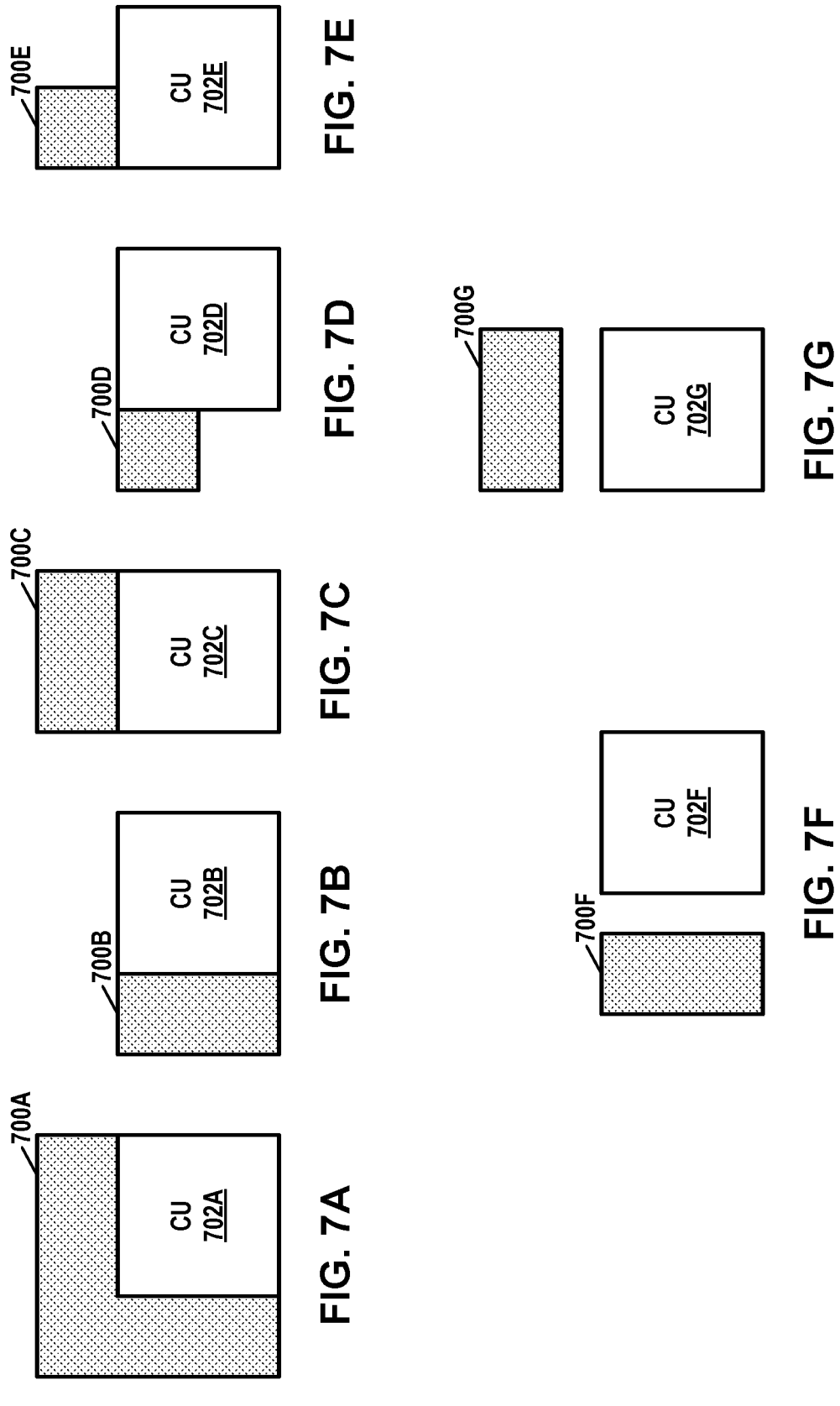
FIG. 7A-7G are conceptual diagrams illustrating examples of different template types according to techniques of this disclosure.

FIGS. 7A-7G are conceptual diagrams illustrating examples of different template patterns accordance to techniques of this disclosure. In FIG. 7A, a template 700A includes samples left of and above a current CU 702A. In FIG. 7B, a template 700B includes samples left of a current CU 702B. In FIG. 7C, a template 700C includes samples above a current CU 702C. In FIG. 7D, a template 700A includes samples left of an upper half of a current CU 702D. In FIG. 7E, a template 700E includes samples above a left half of a current CU 702E. In FIG. 7F, a template 700F includes samples left of a current CU 702F that are not adjacent to current CU 702F. In FIG. 7G, a template 700G includes samples above a current CU 702G that are not adjacent to current CU 702G.

In another example, as a simplified method of the aforementioned first example technique, the template pattern set is composed of three template matching patterns:

(Pattern 1) use both above and left neighboring samples, (Pattern 2) only use above neighboring samples, and (Pattern 3) only use left neighboring samples.

The matching cost of template matching pattern 1 may be derived from the cost of template matching pattern 2 and the cost of template matching pattern 3. In other words, a video coder may calculate a first cost (i.e., the matching cost of a first reference template having template matching pattern 2) based on the differences between samples in a first current template above the current block and samples in a first reference template that has the same shape as the first current template; calculate a second cost (i.e., the matching cost of a second reference template having template matching pattern 3) based on the difference between samples in a second current template left of the current block and samples in a second reference template that has the same shape as the second current template and the same spatial relationship to the first reference template as the first current template has to the second current template; and calculate a third cost (i.e., the cost of a third reference template having template matching pattern 1) as a sum of the first cost and the second cost. In this example, the video coder may repeat this process to determine costs of the first. second, and third reference templates at different locations in a search area. The video coder may then identify a specific reference template based on the determined costs. The video coder may obtain a prediction block based on the identified reference template. Thus, in this example, steps of determining a template pattern from among a set of two or more template patterns and identifying a reference template may be performed together.

In another example, as a simplified method of the aforementioned first example technique, the TM has a base template pattern S, which may be denoted as mode 0. Additional template pattern modes 1 . . . n are all inside the region of S. In other words, the set of template patterns may include a base template pattern S and one or more additional template patterns that fit within a region of the base template pattern S. For example, if template 700A in FIG. 7A is the base template pattern, templates 700B, 700C, 700D, and 700E could be other template patterns because they are all inside template 700A.

In some examples, as a simplified method of the aforementioned first example technique, the template matching cost calculation process always computes the cost of the base template pattern, and sums up two or more of template patterns to determine the cost of the used template pattern. In other words, when identifying a template pattern from among a set of two or more template patterns, a video coder (e.g., video encoder 200 or video decoder 300) may determine a cost for the base template pattern (e.g., using SAD) and may determine costs of the additional template patterns (e.g., using SAD) based on costs of subregions within the region of the base template pattern. The video coder may identify a reference template based on the cost for the base template pattern and the costs for the additional template patterns. For instance, the video coder may identify the reference template that has the lowest cost among reference templates that have the base template pattern and reference templates that have the additional template patterns.

In some examples, as a simplified method of the first example technique, the base template pattern could be template 700A of FIG. 7A. In other words, the base template pattern may include reference samples above and left of the current block.

In some examples, as a simplified method of the first example technique, if the current block uses TM, there is another flag to indicate the template pattern of TM, where mode 0 denotes the base template pattern and modes 1 . . . n denote the additional template patterns. Thus, video encoder 200 may signaling one or more syntax elements that identify the template pattern. Video decoder 300 may obtain, from a bitstream that includes an encoded representation of the video data, one or more syntax elements that indicate the template pattern. Video decoder 300 may determine the template pattern based on the one or more syntax elements. In some examples, the syntax of the matching pattern is signaled in one or more of a CU level, a PU level, a CTU level, a slice level, or a picture level. In other words, the syntax elements that indicate the template pattern may be signaled at a coding unit level, a prediction unit level, a coding tree unit level, a slice level, or a picture level.

A technique involving multiple MV candidates derived from the same template pattern and fusion is now described. In a second example technique, the template matching process of a block has a list (i.e., a candidate list) that stores the best N MV candidates with the minimum template matching cost, the Nis larger than 1. For example, if N=2, the template matching process stores two MV candidates. The two stored MV candidates have the minimum and second minimum costs.

Thus, a video coder (e.g., video encoder 200 or video decoder 300) may generate a list of motion vector candidates. As part of generating the list of motion vector candidates, the video coder may determine template matching costs for reference templates in a plurality of reference templates. Each reference template in the plurality of reference templates has a shape defined by the template pattern. Additionally, as part of generating the list of motion vector candidates, the video coder may select two or more of the reference templates based on the template matching costs for the reference templates. The video coder may include candidates indicating motion vectors of the selected reference templates in the list of motion vector candidates. The video coder may determine a selected motion vector in the list of motion vector candidates. The video coder may use the selected motion vector to determine a location of the prediction block for the current block.

In some examples, video encoder 200 and video decoder 300 may use the N-th minimum cost MV candidate. For example, video encoder 200 and video decoder 300 may use the smallest cost and the third smallest cost MV candidates, the smallest and the fourth smallest cost MV candidates, and so on.

In some examples, in the template matching process, if the distance of the current template matching MV $(x_{cur}, y_{cur})$ and the temporary best candidate MV $(x_{best}, y_{best})$ is smaller than a threshold, video encoder 200 and video decoder 300 do not insert the current template matching MV into the candidate list. In other words, a video coder may exclude a motion vector of a reference template from the list of motion vector candidates based on a comparison of a distance of the motion vector of the reference template and a temporary best candidate motion vector in the list of motion vector candidates.

In some examples, in the template matching process, if the difference of the current template matching block $P_{cur}$ and the temporary best candidate block $P_{best}$ is smaller than a threshold, video encoder 200 and video decoder 300 do not insert the current template matching MV into the candidate list. In other words, a video coder may exclude a motion vector of a reference template from the list of motion vector candidates based on a comparison of a difference between a prediction block of a reference template and a prediction block of a temporary best candidate motion vector in the list of motion vector candidates.

If the difference between template matching costs of two MVs is less than a threshold value, video encoder 200 and video decoder 300 may remove or prune one MV from the candidate list. For example, video encoder 200 and video decoder 300 may remove or prune out the MV with the larger cost out of the two MVs from the candidate list. Thus, a video coder may remove, from the list of motion vector candidates, a candidate that indicates a motion vector of a first one of the selected reference templates based on a comparison of a predefined threshold and a difference of the cost of the first selected reference template and the cost of a second selected reference template.

In another example, video encoder 200 and video decoder 300 may generate a predictor (i.e., a predicted motion vector) from a combination of k MV candidates. For instance, a video coder (e.g., video encoder 200 or video decoder 300) may determine a first prediction block based on the first reference template and determine a second prediction block based on a second reference template. The shape of the first reference template and a shape of the second reference template may be defined by a determined template pattern. The video coder may generate the prediction block for the current block based on the first prediction block and the second prediction block.

In one example, video encoder 200 and video decoder 300 may generate the predictor from a linear combination of k MV candidates. The 0 to k MV candidates could be selected from 0 to N MV candidates from template matching. The combination can be formulated as shown in the following equation:

$$P_{(x,y)} = \frac{(w_0 * P_{0(x,y)} + w_1 * P_{1(x,y)} + \ldots + w_k * P_{k(x,y)})}{(w_0 + w_1 + \ldots + w_k)} \quad (1)$$

where $P_0 \ldots P_k$ are the selected k MV candidates derived from the TM process. In some examples, video encoder 200 and video decoder 300 may derive the combining weight $w_k$ based on the template matching cost. Thus, in some examples, a video coder may determine a weight for a first prediction block based on a template matching cost of a first reference template and determine a weight for the second prediction block based on a template matching cost of the second reference template. The video coder may generate samples of the prediction block for the current block as a combination of samples of the first prediction block and the second prediction block weighted according to the weight for the first prediction block and the weight for the second prediction block.

In one example, video encoder 200 and video decoder 300 may derive the combined weight $w_k$ as the multiplicative inverse of the template matching cost of this candidate $P_k$. Thus, a video coder may determine the weight for a first prediction block based on a multiplicative inverse of the template matching cost of a first reference template. The video coder may determine the weight for a second prediction block based on a multiplicative inverse of the template matching cost of a second reference template.

In some examples, video encoder 200 and video decoder 300 may derive the weights $w_0 \ldots w_k$ for MV candidates $P_0$ to $P_k$ in equation (1) based on the SAD, MSE, or block vector (BV) of candidates $P_0$ to $P_k$, respectively. In other words, a video coder may determine the weight for a first prediction block and determine the weight for a second prediction block based on a SAD, an MSE, or a BV.

In another example, a syntax element indicates that whether some of the N MV candidates in the candidate list are selected and apply the linear combination of these MV candidates. In other words, a syntax element may indicate whether two or more reference templates are selected.

In some examples, if a distance of the current template matching MV ($x_{cur}$, $y_{cur}$) and other MV in the list, for example the first candidate MV ($x_0$, $y_0$), is smaller or larger than a threshold, the weight of the current template matching block could be set to 0. In other words, a video coder (e.g., video encoder 200 or video decoder 300) may set the weight for the first prediction block to 0 based on a comparison of a predefined threshold and a distance of the motion vector of the first reference template and another motion vector in the list of motion vector candidates.

In another example, if the difference of the current template matching block Pour and the temporary best candidate block $P_{best}$ is smaller or larger than a threshold. The weight of the current template matching block could be set to 0. In other words, a video coder may set the weight for the first prediction block to 0 based on a comparison of a predetermined threshold and a difference between the first prediction block and the second prediction block.

In another example, as a simplified method of the aforementioned first example technique, video encoder 200 and video decoder 300 generate the MV predictor from the linear combination of the first two candidates. In other words, a video coder may determine a prediction block based on a linear combination of prediction blocks for two motion vector candidates in the list of motion vector candidates.

In another example, as a simplified method of the aforementioned first example technique, the predictor is generated from the linear combination of the first two candidates if the SAD or MSE of that first two candidates is smaller than a threshold; otherwise, the predictor is generated from the first candidate only. In other words, based on costs of two motion vector candidates in the list of motion vector candidates being less than a threshold, a video coder may determine the prediction block based on a linear combination of prediction blocks for the two motion vector candidates.

Techniques involving combinations of multiple template patterns, multiple candidates, and fusion are now described. In this context, fusion may refer to combining two or more candidates to form an additional candidate. In some examples, the MV candidates from multiple template patterns $P_{mp,0}, P_{mp,1}, \ldots P_{mp,M}$ and the MV candidates from multiple MV candidates $P_{mc,0}, P_{mc,1}, \ldots P_{mc,N}$ could be arbitrarily selected out K MV candidates and a combination may be formed among these K candidates, where K may be larger than 1. In one example, the combination can be a linear combination. Thus, in some examples, a video coder (e.g., video encoder 200 or video decoder 300) may generate a first prediction block using a determined reference template, generate a second prediction block using a motion vector candidate, and generate the prediction block for the current block based on the first prediction block and the second prediction block.

In another example, for some template matching modes, 2 of the candidates from multiple template patterns $P_{mp,0}$, $P_{mp,1}, \ldots P_{mp,M}$ could be linear combined. The combination can be formulated as follows:

$$P_{(x,y)} = \frac{(w_a * P_{mp,a(x,y)} + w_b * P_{mp,b(x,y)})}{(w_a + w_b)} \quad (2)$$

In equation (2), a and b are the selected MV candidates, and $w_a$ and $w_b$ are weights. Video encoder 200 and video decoder 300 may derive the weights $w_a$ and $w_b$ from a template matching cost. In some examples, weights $w_a$ and $w_b$ may be equal (i.e., $w_a = w_b = 1$).

Thus, a part of obtaining a prediction block for a current block, a video coder may generate a first prediction block using a first reference template having a first shape defined by a first template pattern. The video coder may identify a second reference template based on a similarity of the second reference template and a second current template. The second reference template and the second current template have a shape defined by a second template pattern different from the first template pattern. The second reference template includes second previously reconstructed samples and the second current template includes second reference samples of the current block. The video coder may generate a second prediction block using the second reference template. The video coder may generate the prediction block for the current block based on the first prediction block and the second prediction block. In this example, the video coder may determine a weight for the first prediction block and a weight for the second prediction block based on template matching costs of the first reference template and the second reference template. The video coder may generate samples of the prediction block for the current block as a combination of samples of the first prediction block and the second prediction block weighted according to the weight for the first prediction block and the weight for the second prediction block.

In some examples, a certain template pattern (or certain template patterns) may have a dedicated fusion method, and some other template patterns may not have fusion applied. For example, when left and above template patterns are used, video encoder 200 and video decoder 300 may then optionally apply fusion to such patterns. For example, video encoder 200 and video decoder 300 may apply fusion with the two smallest-cost candidates, while video encoder 200 and video decoder 300 do not apply fusion with other template patterns. In this way, a better trade-off may be achieved because the fusion provides enough diversity while overhead signaling may be reduced by not having fusion for other patterns.

Examples of signaling and syntax are now described. The described additional modes (various patterns, fusion, etc.) may be indicated by a syntax element transmitted in a bitstream to video decoder 300. In another example, video encoder 200 and video decoder 300 may implicitly derive the used mode for prediction without signaling by following the same process. In one example, the modes may be ordered based on the template matching cost and the smallest cost mode is selected to be used. In some examples, the modes may be ordered, for example by template matching cost, and an index is signaled to this ordered list of modes to identify the one to be used.

In some examples, if template matching is applied in the current block, there is a flag to indicate that whether the multiple candidates are selected and a combination process for the candidate predictors is applied. In some examples, if template matching is applied in the current block, there is a flag to indicate that the type of template pattern which is used in the template matching process.

Figure 8:
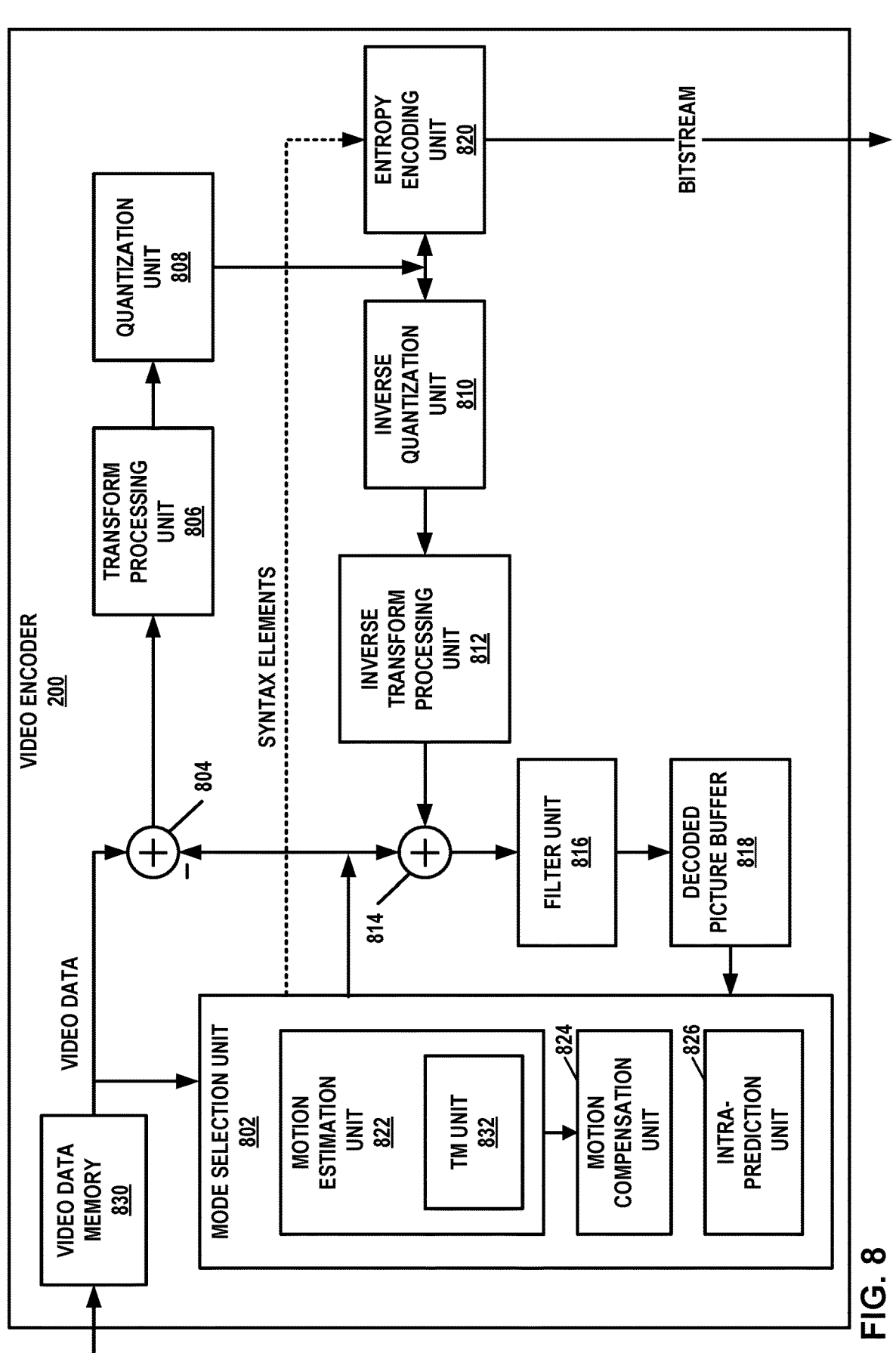
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 8, video encoder 200 includes video data memory 830, mode selection unit 802, residual generation unit 804, transform processing unit 806, quantization unit 808, inverse quantization unit 810, inverse transform processing unit 812, reconstruction unit 814, filter unit 816, decoded picture buffer (DPB) 818, and entropy encoding unit 820. Any or all of video data memory 830, mode selection unit 802, residual generation unit 804, transform processing unit 806, quantization unit 808, inverse quantization unit 810, inverse transform processing unit 812, reconstruction unit 814, filter unit 816, DPB 818, and entropy encoding unit 820 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 830 may store video data to be encoded by the components of video encoder 200. Video encoder 200 may receive the video data stored in video data memory 830 from, for example, video source 104 (FIG. 1). DPB 818 may act as a reference picture memory that stores reference video data for use in prediction of subsequent video data by video encoder 200. Video data memory 830 and DPB 818 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 830 and DPB 818 may be provided by the same memory device or separate memory devices. In various examples, video data memory 830 may be on-chip with other components of video encoder 200, as illustrated, or off-chip relative to those components.

In this disclosure, reference to video data memory 830 should not be interpreted as being limited to memory internal to video encoder 200, unless specifically described as such, or memory external to video encoder 200, unless specifically described as such. Rather, reference to video data memory 830 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 830 is configured to store received video data. Video encoder 200 may retrieve a picture of the video data from video data memory 830 and provide the video data to residual generation unit 804 and mode selection unit 802. Video data in video data memory 830 may be raw video data that is to be encoded.

Mode selection unit 802 includes a motion estimation unit 822, a motion compensation unit 824, and an intra-prediction unit 826. Mode selection unit 802 may include additional functional units to perform video prediction in accordance with other prediction modes. As examples, mode selection unit 802 may include a palette unit, an intra-block copy unit (which may be part of motion estimation unit 822 and/or motion compensation unit 824), an affine unit, a linear model (LM) unit, or the like. In the example of FIG. 8, motion estimation unit 822 includes a TM unit 832. In accordance with a technique of this disclosure, TM unit 832 may determine a template pattern from among a set of two or more template patterns. TM unit 832 may identify a reference template based on a similarity of the reference template and a current template. The reference template and the current template may have shapes defined by the template pattern. The reference template includes previously reconstructed samples and the current template includes reference samples of a current block of a current picture of the video data. Motion compensation unit 824 may obtain, based on the reference template, a prediction block for a current block of a current picture of the video data.

Mode selection unit 802 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 802 may ultimately select the combination of encoding parameters having rate-distortion values that are better than the other tested combinations.

Video encoder 200 may partition a picture retrieved from video data memory 830 into a series of CTUs, and encapsulate one or more CTUs within a slice. Mode selection unit 802 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 802 also controls the components thereof (e.g., motion estimation unit 822, motion compensation unit 824, and intra-prediction unit 826) to generate a prediction block for a current block (e.g., a current CU, or in HEVC, the overlapping portion of a PU and a TU). For inter-prediction of a current block, motion estimation unit 822 may perform a motion search to identify one or more closely matching reference blocks in one or more reference pictures (e.g., one or more previously coded pictures stored in DPB 818). In particular, motion estimation unit 822 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 822 may generally perform these calculations using sample-by-sample differences between the current block and the reference block being considered. Motion estimation unit 822 may identify a reference block having a lowest value resulting from these calculations, indicating a reference block that most closely matches the current block.

Motion estimation unit 822 may form one or more motion vectors (MVs) that defines the positions of the reference blocks in the reference pictures relative to the position of the current block in a current picture. Motion estimation unit 822 may then provide the motion vectors to motion compensation unit 824. For example, for uni-directional inter-prediction, motion estimation unit 822 may provide a single motion vector, whereas for bi-directional inter-prediction, motion estimation unit 822 may provide two motion vectors. Motion compensation unit 824 may then generate a prediction block using the motion vectors. For example, motion compensation unit 824 may retrieve data of the reference block using the motion vector. As another example, if the motion vector has fractional sample precision, motion compensation unit 824 may interpolate values for the prediction block according to one or more interpolation filters. Moreover, for bi-directional inter-prediction, motion compensation unit 824 may retrieve data for two reference blocks identified by respective motion vectors and combine the retrieved data, e.g., through sample-by-sample averaging or weighted averaging.

When operating according to the AV1 video coding format, motion estimation unit 822 and motion compensation unit 824 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 826 may generate the prediction block from samples neighboring the current block. For example, for directional modes, intra-prediction unit 826 may generally mathematically combine values of neighboring samples and populate these calculated values in the defined direction across the current block to produce the prediction block. As another example, for DC mode, intra-prediction unit 826 may calculate an average of the neighboring samples to the current block and generate the prediction block to include this resulting average for each sample of the prediction block.

When operating according to the AV1 video coding format, intra-prediction unit 826 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 802 may include additional functional units to perform video prediction in accordance with other prediction modes.

Mode selection unit 802 provides the prediction block to residual generation unit 804. Residual generation unit 804 receives a raw, unencoded version of the current block from video data memory 830 and the prediction block from mode selection unit 802. Residual generation unit 804 calculates sample-by-sample differences between the current block and the prediction block. The resulting sample-by-sample differences define a residual block for the current block. In some examples, residual generation unit 804 may also determine differences between sample values in the residual block to generate a residual block using residual differential pulse code modulation (RDPCM). In some examples, residual generation unit 804 may be formed using one or more subtractor circuits that perform binary subtraction.

In examples where mode selection unit 802 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 802 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 802, via respective units associated with the coding techniques, generates a prediction block for the current block being encoded. In some examples, such as palette mode coding, mode selection unit 802 may not generate a prediction block, and instead generate syntax elements that indicate the manner in which to reconstruct the block based on a selected palette. In such modes, mode selection unit 802 may provide these syntax elements to entropy encoding unit 820 to be encoded.

As described above, residual generation unit 804 receives the video data for the current block and the corresponding prediction block. Residual generation unit 804 then generates a residual block for the current block. To generate the residual block, residual generation unit 804 calculates sample-by-sample differences between the prediction block and the current block.

Transform processing unit 806 applies one or more transforms to the residual block to generate a block of transform coefficients (referred to herein as a "transform coefficient block"). Transform processing unit 806 may apply various transforms to a residual block to form the transform coefficient block. For example, transform processing unit 806 may apply a discrete cosine transform (DCT), a directional transform, a Karhunen-Loeve transform (KLT), or a conceptually similar transform to a residual block. In some examples, transform processing unit 806 may perform multiple transforms to a residual block, e.g., a primary transform and a secondary transform, such as a rotational transform. In some examples, transform processing unit 806 does not apply transforms to a residual block.

When operating according to AV1, transform processing unit 806 may apply one or more transforms to the residual block to generate a block of transform coefficients (referred to herein as a "transform coefficient block"). Transform processing unit 806 may apply various transforms to a residual block to form the transform coefficient block. For example, transform processing unit 806 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 808 may quantize the transform coefficients in a transform coefficient block, to produce a quantized transform coefficient block. Quantization unit 808 may quantize transform coefficients of a transform coefficient block according to a quantization parameter (QP) value associated with the current block. Video encoder 200 (e.g., via mode selection unit 802) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 806.

Inverse quantization unit 810 and inverse transform processing unit 812 may apply inverse quantization and inverse transforms to a quantized transform coefficient block, respectively, to reconstruct a residual block from the transform coefficient block. Reconstruction unit 814 may produce a reconstructed block corresponding to the current block (albeit potentially with some degree of distortion) based on the reconstructed residual block and a prediction block generated by mode selection unit 802. For example, reconstruction unit 814 may add samples of the reconstructed residual block to corresponding samples from the prediction block generated by mode selection unit 802 to produce the reconstructed block.

Filter unit 816 may perform one or more filter operations on reconstructed blocks. For example, filter unit 816 may perform deblocking operations to reduce blockiness artifacts along edges of CUs. Operations of filter unit 816 may be skipped, in some examples.

When operating according to AV1, filter unit 816 may perform one or more filter operations on reconstructed blocks. For example, filter unit 816 may perform deblocking operations to reduce blockiness artifacts along edges of CUs. In other examples, filter unit 816 may apply a constrained directional enhancement filter (CDEF), which may be applied after deblocking, and may include the application of non-separable, non-linear, low-pass directional filters based on estimated edge directions. Filter unit 816 may also include a loop restoration filter, which is applied after CDEF, and may include a separable symmetric normalized Wiener filter or a dual self-guided filter.

Video encoder 200 stores reconstructed blocks in DPB 818. For instance, in examples where operations of filter unit 816 are not performed, reconstruction unit 814 may store reconstructed blocks to DPB 818. In examples where operations of filter unit 816 are performed, filter unit 816 may store the filtered reconstructed blocks to DPB 818. Motion estimation unit 822 and motion compensation unit 824 may retrieve a reference picture from DPB 818, formed from the reconstructed (and potentially filtered) blocks, to inter-predict blocks of subsequently encoded pictures. In addition, intra-prediction unit 826 may use reconstructed blocks in DPB 818 of a current picture to intra-predict other blocks in the current picture.

In general, entropy encoding unit 820 may entropy encode syntax elements received from other functional components of video encoder 200. For example, entropy encoding unit 820 may entropy encode quantized transform coefficient blocks from quantization unit 808. As another example, entropy encoding unit 820 may entropy encode prediction syntax elements (e.g., motion information for inter-prediction or intra-mode information for intra-prediction) from mode selection unit 802. Entropy encoding unit 820 may perform one or more entropy encoding operations on the syntax elements, which are another example of video data, to generate entropy-encoded data. For example, entropy encoding unit 820 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 820 may operate in bypass mode where syntax elements are not entropy encoded.

Video encoder 200 may output a bitstream that includes the entropy encoded syntax elements needed to reconstruct blocks of a slice or picture. In particular, entropy encoding unit 820 may output the bitstream.

In accordance with AV1, entropy encoding unit 820 may be configured as a symbol-to-symbol adaptive multi-symbol arithmetic coder. A syntax element in AV1 includes an alphabet of N elements, and a context (e.g., probability model) includes a set of N probabilities. Entropy encoding unit 820 may store the probabilities as n-bit (e.g., 15-bit) cumulative distribution functions (CDFs). Entropy encoding unit 820 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a template pattern from among a set of two or more template patterns; identify a reference template based on a similarity of the reference template and a current template, wherein the reference template and the current template have a shape defined by the template pattern, the reference template includes previously reconstructed samples and the current template includes reference samples of a current block of a current picture of the video data; obtain, based on the reference template, a prediction block for a current block of a current picture of the video data; and encode the current block based on the prediction block.

Figure 9:
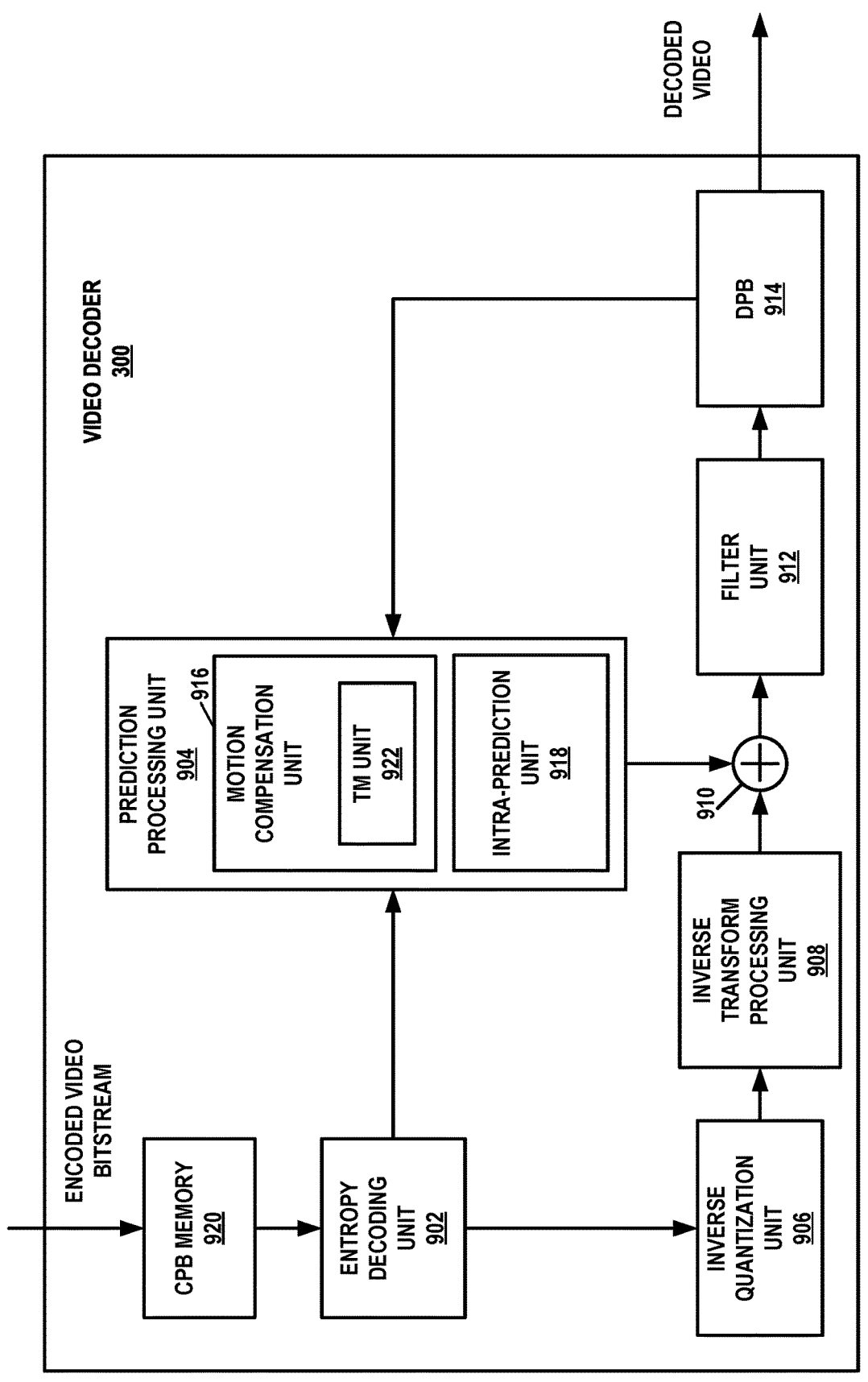
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 9, video decoder 300 includes coded picture buffer (CPB) memory 920, entropy decoding unit 902, prediction processing unit 904, inverse quantization unit 906, inverse transform processing unit 908, reconstruction unit 910, filter unit 912, and DPB 914. Any or all of CPB memory 920, entropy decoding unit 902, prediction processing unit 904, inverse quantization unit 906, inverse transform processing unit 908, reconstruction unit 910, filter unit 912, and DPB 914 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 904 includes motion compensation unit 916 and intra-prediction unit 918. Prediction processing unit 904 may include additional units to perform prediction in accordance with other prediction modes. As examples, prediction processing unit 904 may include a palette unit, an intra-block copy unit (which may form part of motion compensation unit 916), an affine unit, a linear model (LM) unit, or the like. In other examples, video decoder 300 may include more, fewer, or different functional components.

When operating according to AV1, motion compensation unit 916 may be configured to decode coding blocks of video data (e.g., both luma and chroma coding blocks) using translational motion compensation, affine motion compensation, OBMC, and/or compound inter-intra prediction, as described above. Intra-prediction unit 918 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 920 may store video data, such as an encoded video bitstream, to be decoded by the components of video decoder 300. The video data stored in CPB memory 920 may be obtained, for example, from computer-readable medium 110 (FIG. 1). CPB memory 920 may include a CPB that stores encoded video data (e.g., syntax elements) from an encoded video bitstream. Also, CPB memory 920 may store video data other than syntax elements of a coded picture, such as temporary data representing outputs from the various units of video decoder 300. DPB 914 generally stores decoded pictures, which video decoder 300 may output and/or use as reference video data when decoding subsequent data or pictures of the encoded video bitstream. CPB memory 920 and DPB 914 may be formed by any of a variety of memory devices, such as DRAM, including SDRAM, MRAM, RRAM, or other types of memory devices. CPB memory 920 and DPB 914 may be provided by the same memory device or separate memory devices. In various examples, CPB memory 920 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 920. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 902 may receive encoded video data from the CPB and entropy decode the video data to reproduce syntax elements. Prediction processing unit 904, inverse quantization unit 906, inverse transform processing unit 908, reconstruction unit 910, and filter unit 912 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 902 may entropy decode syntax elements defining quantized transform coefficients of a quantized transform coefficient block, as well as transform information, such as a quantization parameter (QP) and/or transform mode indication(s). Inverse quantization unit 906 may use the QP associated with the quantized transform coefficient block to determine a degree of quantization and, likewise, a degree of inverse quantization for inverse quantization unit 906 to apply. Inverse quantization unit 906 may, for example, perform a bitwise left-shift operation to inverse quantize the quantized transform coefficients. Inverse quantization unit 906 may thereby form a transform coefficient block including transform coefficients.

After inverse quantization unit 906 forms the transform coefficient block, inverse transform processing unit 908 may apply one or more inverse transforms to the transform coefficient block to generate a residual block associated with the current block. For example, inverse transform processing unit 908 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 904 generates a prediction block according to prediction information syntax elements that were entropy decoded by entropy decoding unit 902. For example, if the prediction information syntax elements indicate that the current block is inter-predicted, motion compensation unit 916 may generate the prediction block. In this case, the prediction information syntax elements may indicate a reference picture in DPB 914 from which to retrieve a reference block, as well as a motion vector identifying a location of the reference block in the reference picture relative to the location of the current block in the current picture. Motion compensation unit 916 may generally perform the inter-prediction process in a manner that is substantially similar to that described with respect to motion compensation unit 824 (FIG. 8).

TM unit 922 may perform one or more template-matching operations to generate a prediction block. In accordance with a technique of this disclosure, TM unit 922 may determine a template pattern from among a set of two or more template patterns. Additionally, TM unit 922 may identify a reference template based on a similarity of the reference template and a current template. The reference template and the current template have a shape defined by the template pattern. The reference template may include previously reconstructed samples and the current template includes reference samples of a current block of a current picture of the video data. TM unit 922 may obtain, based on the reference template, a prediction block for a current block of a current picture of the video data.

If the prediction information syntax elements indicate that the current block is intra-predicted, intra-prediction unit 918 may generate the prediction block according to an intra-prediction mode indicated by the prediction information syntax elements. Again, intra-prediction unit 918 may generally perform the intra-prediction process in a manner that is substantially similar to that described with respect to intra-prediction unit 826 (FIG. 8). Intra-prediction unit 918 may retrieve data of neighboring samples to the current block from DPB 914.

Reconstruction unit 910 may reconstruct the current block using the prediction block and the residual block. For example, reconstruction unit 910 may add samples of the residual block to corresponding samples of the prediction block to reconstruct the current block.

Filter unit 912 may perform one or more filter operations on reconstructed blocks. For example, filter unit 912 may perform deblocking operations to reduce blockiness artifacts along edges of the reconstructed blocks. Operations of filter unit 912 are not necessarily performed in all examples.

Video decoder 300 may store the reconstructed blocks in DPB 914. For instance, in examples where operations of filter unit 912 are not performed, reconstruction unit 910 may store reconstructed blocks to DPB 914. In examples where operations of filter unit 912 are performed, filter unit 912 may store the filtered reconstructed blocks to DPB 914. As discussed above, DPB 914 may provide reference information, such as samples of a current picture for intra-prediction and previously decoded pictures for subsequent motion compensation, to prediction processing unit 904. Moreover, video decoder 300 may output decoded pictures (e.g., decoded video) from DPB 914 for subsequent presentation on a display device, such as display device 118 of FIG. 1.

In this manner, video decoder 300 represents an example of a video decoding device including a memory configured to store video data, and one or more processing units implemented in circuitry and configured to determine a template pattern from among a set of two or more template patterns; identify a reference template based on a similarity of the reference template and a current template, wherein the reference template and the current template have a shape defined by the template pattern, the reference template includes previously reconstructed samples and the current template includes reference samples of a current block of a current picture of the video data; obtain, based on the reference template, a prediction block for a current block of a current picture of the video data; and decode the current block based on the prediction block.

Figure 10:
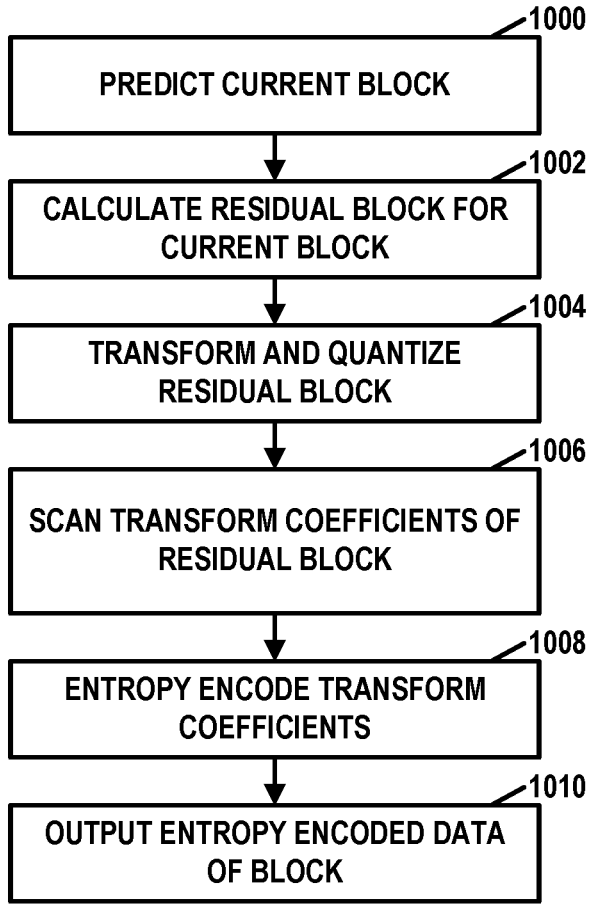
FIG. 10 is a flowchart illustrating an example method for encoding a current block in accordance with the techniques of this disclosure.

FIG. 10 is a flowchart illustrating an example method for encoding a current block in accordance with the techniques of this disclosure. The current block may be or include a current CU. Although described with respect to video encoder 200 (FIGS. 1 and 8), it should be understood that other devices may be configured to perform a method similar to that of FIG. 10.

In this example, video encoder 200 initially predicts the current block (1000). For example, video encoder 200 may form a prediction block for the current block. Video encoder 200 may generate the prediction block using the template-matching techniques of this disclosure.

Video encoder 200 may then calculate a residual block for the current block (1002). To calculate the residual block, video encoder 200 may calculate a difference between the original, unencoded block and the prediction block for the current block. Video encoder 200 may then transform the residual block and quantize transform coefficients of the residual block (1004). Next, video encoder 200 may scan the quantized transform coefficients of the residual block (1006). During the scan, or following the scan, video encoder 200 may entropy encode the transform coefficients (1008). For example, video encoder 200 may encode the transform coefficients using CAVLC or CABAC. Video encoder 200 may then output the entropy encoded data of the block (1010).

Figure 11:
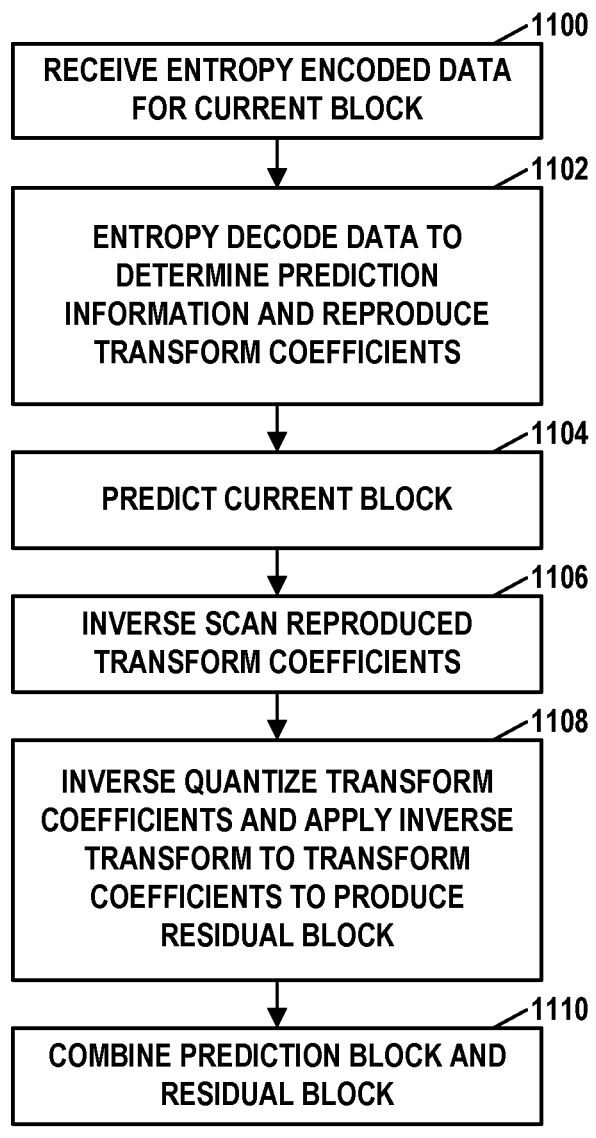
FIG. 11 is a flowchart illustrating an example method for decoding a current block in accordance with the techniques of this disclosure.

FIG. 11 is a flowchart illustrating an example method for decoding a current block of video data in accordance with the techniques of this disclosure. The current block may be or include a current CU. Although described with respect to video decoder 300 (FIGS. 1 and 9), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (1100). Video decoder 300 may entropy decode the entropy encoded data to determine prediction information for the current block and to reproduce transform coefficients of the residual block (1102). Video decoder 300 may predict the current block (1104), e.g., using an intra- or inter-prediction mode as indicated by the prediction information for the current block, to calculate a prediction block for the current block. Video decoder 300 may generate the prediction block using the template-matching techniques of this disclosure.

Video decoder 300 may then inverse scan the reproduced transform coefficients (1106), to create a block of quantized transform coefficients. Video decoder 300 may then inverse quantize the transform coefficients and apply an inverse transform to the transform coefficients to produce a residual block (1108). Video decoder 300 may ultimately decode the current block by combining the prediction block and the residual block (1110).

Figure 12:
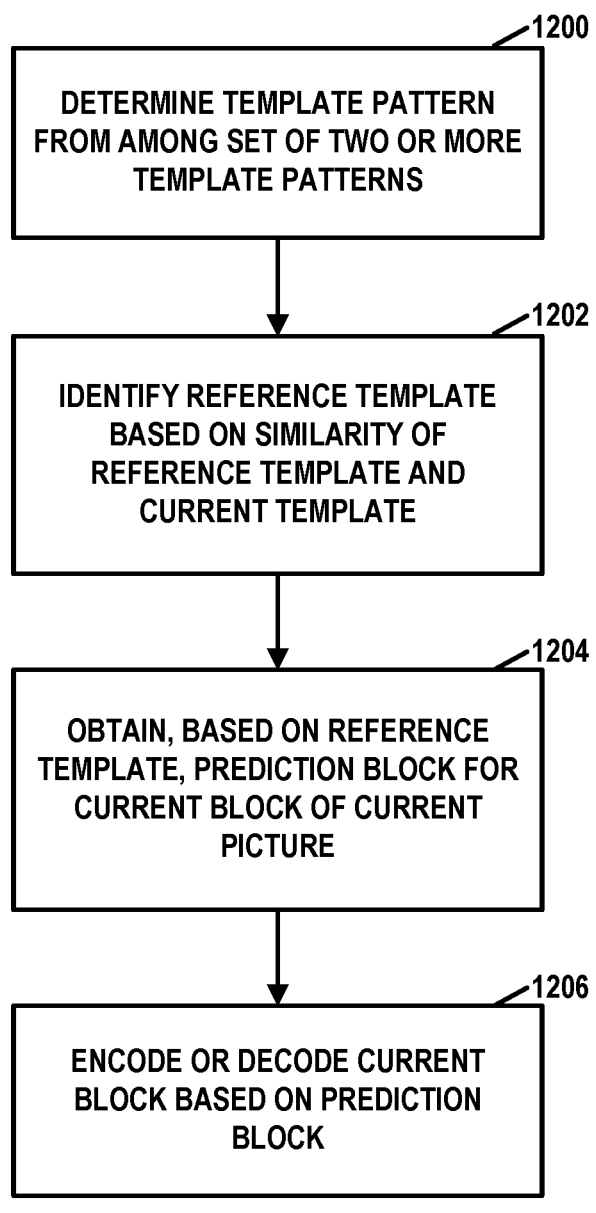
FIG. 12 is a flowchart illustrating an example method for encoding or decoding video data involving template matching according to techniques of this disclosure.

FIG. 12 is a flowchart illustrating an example method for encoding or decoding video data involving template matching according to techniques of this disclosure. In the example of FIG. 12, a video coder (e.g., video encoder 200 or video decoder 300) may determine a template pattern from among a set of two or more template patterns (1200). In some examples, the set of two or more template patterns includes a base template pattern and one or more additional template patterns that fit within a region of the base template pattern. A template having a shape defined by the base template pattern may include reference samples above and left of the current block. In some such examples, the video coder may determine a cost for the base template pattern and may determine costs of the additional template patterns based on costs of subregions within the region of the base template pattern. The video coder may determine the template pattern from among the two or more template patterns based on the cost for the base template pattern and the costs for the additional template patterns. For instance, the video coder may determine which template pattern in the set of two or more template patterns has the lowest cost.

In some examples where the video coder is video encoder 200, video encoder 200 may signal one or more syntax elements that identify the template pattern. In some examples where the video coder is video decoder 300, video decoder 300 may obtain, from a bitstream that includes an encoded representation of the video data, one or more syntax elements that indicate the template pattern and may determine the template pattern based on the one or more syntax elements. In such examples, it may be unnecessary for video decoder 300 to determine costs for template patterns.

The video coder may identify a reference template based on a similarity of the reference template and a current template (1202). The reference template and the current template have a shape defined by the template pattern. The reference template includes previously reconstructed samples. The current template includes reference samples of a current block of a current picture of the video data. For instance, the video coder may perform a search within a search area of the current picture or a reference picture to identify a reference template having samples similar to samples in the current template.

The video coder may obtain, based on the reference template, a prediction block for a current block of a current picture of the video data (1204). In some examples, bi-directional prediction is used, the reference template is a first reference template, and, as part of obtaining the prediction block for the current block, the video coder may determine a first prediction block based on the first reference template. The video coder may also determine a second prediction block based on a second reference template. In this example, the shape of the first reference template and a shape of the second reference template are defined by the template pattern. The video coder may generate the prediction block for the current block based on the first prediction block and the second prediction block. In some examples, bi-directional prediction is used, the video coder may generate a first prediction block using the reference template, generate a second prediction block using a motion vector candidate, and may generate the prediction block for the current block based on the first prediction block and the second prediction block.

The video coder may encode or decode the current block based on the prediction block (1206). For example, as part of encoding the current block, the video coder may generate residual data indicating differences between the current block and the prediction block. The video coder may apply a transformation to the residual data to generate transform coefficients. The video coder may then quantize the transform coefficients and apply entropy encoding to syntax elements representing the quantized transform coefficients. In an example where the video coder decodes the current block, the video coder may obtain residual data and combine the residual data with the prediction block to reconstruct the current block.

The following numbered clauses illustrate one or more aspects of the devices and techniques described in this disclosure.

Clause 1A. A method of coding video data, the method comprising: determining a template pattern from among a set of two or more template patterns; identifying a reference template based on a similarity of the reference template and a current template, wherein the reference template and the current template have a shape defined by the template pattern, the reference template includes previously recon-structed samples and the current template includes reference samples of a current block of a current picture of the video data; obtaining, based on the reference template, a prediction block for a current block of a current picture of the video data; and encoding or decoding the current block based on the prediction block.

Clause 2A. The method of clause 1A, wherein the set of template patterns includes a base template pattern and one or more additional template patterns that fit within a region of the base template pattern.

Clause 3A. The method of clause 2A, wherein identifying the reference template comprises: determining a cost for the base template pattern; and determining costs of the additional template patterns based on costs of subregions within the region of the base template pattern.

Clause 4A. The method of any of clauses 2A and 3A, wherein a template having a shape defined by the base template pattern includes reference samples above and left of the current block.

Clause 5A. The method of any of clauses 1A-4A, further comprising signaling one or more syntax elements that identify the template pattern.

Clause 6A. The method of any of clauses 1A-4A, wherein: the method further comprises obtaining, from a bitstream that includes an encoded representation of the video data, one or more syntax elements that indicate a template pattern; and determining the template pattern comprises determining the template pattern based on the one or more syntax elements.

Clause 7A. The method of any of clauses 5A or 6A, wherein the syntax elements are signaled at a coding unit, prediction unit, coding tree unit, slice, or picture level.

Clause 8A. The method of any of clauses 1A-7A, wherein: the reference template is a first reference template, and the method further comprises: generating a list of motion vector candidates, wherein generating the list of motion vector candidates comprises: determining template matching costs for reference templates in a plurality of reference templates, wherein each reference template in the plurality of reference templates has a shape defined by the template shape; selecting two or more of the reference templates based on the template matching costs for the reference templates, wherein the selected reference tem-plates include the first reference template; and including candidates indicating motion vectors of the selected refer-ence templates in the list of motion vector candidates, determining a selected motion vector in the list of motion vector candidates, wherein the selected motion vector is the motion vector of the first reference template; and using the selected motion vector to determine a location of the pre-diction block for the current block.

Clause 9A. The method of clause 8A, wherein generating the list of motion vector candidates comprises excluding a motion vector of a reference template from the list of motion vector candidates based on a comparison of a distance of the motion vector of the reference template and a temporary best candidate motion vector in the list of motion vector candi-dates.

Clause 10A. The method of any of clauses 8A-9A, wherein generating the list of motion vector candidates comprises excluding a motion vector of a reference template from the list of motion vector candidates based on a com-parison of a difference between a prediction block of a reference template and a prediction block of a temporary best candidate motion vector in the list of motion vector candidates.

Clause 11A. The method of any of clauses 8A-10A, wherein generating the list of motion vector candidates comprises removing, from the list of motion vector candi-dates, a candidate that indicates a motion vector of a first one of the selected reference templates based on a comparison of a predefined threshold and a difference of the cost value of the first selected reference template and the cost value of a second selected reference template.

Clause 12A. The method of any of clauses 1A-11A, wherein: the reference template is a first reference template, and obtaining the prediction block comprises: determining a first prediction block based on the first reference template; determining a second prediction block based on a second reference template, wherein the shape of the first reference template and a shape of the second reference template are defined by the template pattern; and generating the predic-tion block for the current block based on the first prediction block and the second prediction block.

Clause 13A. The method of clause 12A, wherein gener-ating the prediction block for the current block comprises: determining a weight for the first prediction block based on a template matching cost of the first reference template; determining a weight for the second prediction block based on a template matching cost of the second reference template; and generating samples of the prediction block for the current block as a combination of samples of the first prediction block and the second prediction block weighted according to the weight for the first prediction block and the weight for the second prediction block.

Clause 14A. The method of clause 13A, wherein determining the weight for the first prediction block and determining the weight for the second prediction block comprises determining the weight for the first prediction block and determining the weight for the second prediction block based on a sum of absolute differences (SAD), a mean square error (MSE), or a block vector (BV).

Clause 15A. The method of clause 13A, wherein: determining the weight for the first prediction block comprises determining the weight for the first prediction block based on a multiplicative inverse of the template matching cost of the first reference template, and determining the weight for the second prediction block comprises determining the weight for the second prediction block based on a multiplicative inverse of the template matching cost of the second reference template.

Clause 16A. The method of any of clauses 13A-15A, wherein determining the weight for the first prediction block comprises setting the weight for the first prediction block to 0 based on a comparison of a predefined threshold and a distance of the motion vector of the first reference template and another motion vector in the list of motion vector candidates.

Clause 17A. The method of any of clauses 13A-16A, wherein determining the weight for the first prediction block comprises setting the weight for the first prediction block to 0 based on a comparison of a predetermined threshold and a difference between the first prediction block and the second prediction block.

Clause 18A. The method of any of clauses 8A-17A, wherein obtaining the prediction block comprises determining the prediction block based on a linear combination of prediction blocks for two motion vector candidates in the list of motion vector candidates.

Clause 19A. The method of any of clauses 8A-17A, wherein obtaining the prediction block comprises, based on cost values of two motion vector candidates in the list of motion vector candidates being less than a threshold, determining the prediction block based on a linear combination of prediction blocks for the two motion vector candidates.

Clause 20A. The method of any of clauses 8A-19A, wherein a syntax element indicates the whether the two or more reference templates are selected.

Clause 21A. The method of any of clauses 1A-20A, wherein obtaining the prediction block for the current block comprises: generating a first prediction block using the reference template; generating a second prediction block using a motion vector candidate; and generating the prediction block for the current block based on the first prediction block and the second prediction block.

Clause 22A. The method of any of clauses 1A-21A, wherein: the template pattern is a first template pattern, the reference template is a first reference template, and the current template is a first current template, obtaining the prediction block for the current block comprises: generating a first prediction block using the first reference template; identifying a second reference template based on a similarity of the second reference template and a second current template, wherein the second reference template and the second current template have a shape defined by a second template pattern different from the first template pattern, the second reference template includes second previously reconstructed samples and the second current template includes second reference samples of the current block; generating a second prediction block using the second reference template; and generating the prediction block for the current block based on the first prediction block and the second prediction block.

Clause 23A. The method of clause 22A, wherein generating the prediction block for the current block comprises: determining a weight for the first prediction block and a weight for the second prediction block based on template matching costs of the first reference template and the second reference template; and generating samples of the prediction block for the current block as a combination of samples of the first prediction block and the second prediction block weighted according to the weight for the first prediction block and the weight for the second prediction block.

Clause 24A. A device for coding video data, the device comprising one or more means for performing the method of any of clauses 1A-23A.

Clause 25A. The device of clause 24A, wherein the one or more means comprise one or more processors implemented in circuitry.

Clause 26A. The device of any of clauses 24A and 25A, further comprising a memory to store the video data.

Clause 27A. The device of any of clauses 24A-26A, further comprising a display configured to display decoded video data.

Clause 28A. The device of any of clauses 24A-27A, wherein the device comprises one or more of a camera, a computer, a mobile device, a broadcast receiver device, or a set-top box.

Clause 29A. The device of any of clauses 24A-28A, wherein the device comprises a video decoder.

Clause 30A. The device of any of clauses 24A-29A, wherein the device comprises a video encoder.

Clause 31A. A computer-readable storage medium having stored thereon instructions that, when executed, cause one or more processors to perform the method of any of clauses 1A-23A.

Clause 1B. A method of coding video data, the method comprising: determining a template pattern from among a set of two or more template patterns; identifying a reference template based on a similarity of the reference template and a current template, wherein the reference template and the current template have a shape defined by the template pattern, the reference template includes previously reconstructed samples and the current template includes reference samples of a current block of a current picture of the video data; obtaining, based on the reference template, a prediction block for the current block; and encoding or decoding the current block based on the prediction block.

Clause 2B. The method of clause 1B, wherein the set of two or more template patterns includes a base template pattern and one or more additional template patterns that fit within a region of the base template pattern.

Clause 3B. The method of clause 2B, wherein identifying the reference template comprises: determining a cost for the base template pattern; and determining costs of the additional template patterns based on costs of subregions within the region of the base template pattern.

Clause 4B. The method of any of clauses 2B-3B, wherein a template having a shape defined by the base template pattern includes reference samples above and left of the current block.

Clause 5B. The method of any of clauses 1B-4B, further comprising signaling one or more syntax elements that identify the template pattern.

Clause 6B. The method of any of clauses 1B-4B, wherein: the method further comprises obtaining, from a bitstream that includes an encoded representation of the video data, one or more syntax elements that indicate the template pattern; and determining the template pattern comprises determining the template pattern based on the one or more syntax elements.

Clause 7B. The method of any of clauses 1B-6B, wherein: the reference template is a first reference template, and the method further comprises: generating a list of motion vector candidates, wherein generating the list of motion vector candidates comprises: determining template matching costs for reference templates in a plurality of reference templates, wherein each reference template in the plurality of reference templates has the shape defined by the template pattern; selecting two or more of the reference templates based on the template matching costs for the reference templates, wherein the selected reference templates include the first reference template; and including candidates indicating motion vectors of the selected reference templates in the list of motion vector candidates, determining a selected motion vector in the list of motion vector candidates, wherein the selected motion vector is the motion vector of the first reference template; and using the selected motion vector to determine a location of the prediction block for the current block.

Clause 8B. The method of clause 7B, wherein generating the list of motion vector candidates comprises at least one of: excluding a motion vector of a reference template from the list of motion vector candidates based on a comparison of a distance of the motion vector of the reference template and a temporary best candidate motion vector in the list of motion vector candidates, excluding a motion vector of a reference template from the list of motion vector candidates based on a comparison of a difference between a prediction block of a reference template and a prediction block of a temporary best candidate motion vector in the list of motion vector candidates, or removing, from the list of motion vector candidates, a candidate that indicates a motion vector of a first one of the selected reference templates based on a comparison of a predefined threshold and a difference of the cost of the first selected reference template and the cost of a second selected reference template.

Clause 9B. The method of any of clauses 7B-8B, wherein: the reference template is a first reference template, and obtaining the prediction block comprises: determining a first prediction block based on the first reference template; determining a second prediction block based on a second reference template, wherein the shape of the first reference template and a shape of the second reference template are defined by the template pattern; and generating the prediction block for the current block based on the first prediction block and the second prediction block.

Clause 10B. The method of clause 9B, wherein generating the prediction block for the current block comprises: determining a weight for the first prediction block based on a template matching cost of the first reference template; determining a weight for the second prediction block based on a template matching cost of the second reference template; and generating samples of the prediction block for the current block as a combination of samples of the first prediction block and the second prediction block weighted according to the weight for the first prediction block and the weight for the second prediction block.

Clause 11B. The method of clause 10B, wherein: determining the weight for the first prediction block comprises determining the weight for the first prediction block based on a multiplicative inverse of the template matching cost of the first reference template, and determining the weight for the second prediction block comprises determining the weight for the second prediction block based on a multiplicative inverse of the template matching cost of the second reference template.

Clause 12B. The method of any of clauses 10B-11B, wherein determining the weight for the first prediction block comprises at least one of: setting the weight for the first prediction block to 0 based on a comparison of a predefined threshold and a distance of the motion vector of the first reference template and another motion vector in the list of motion vector candidates, or setting the weight for the first prediction block to 0 based on a comparison of a predetermined threshold and a difference between the first prediction block and the second prediction block.

Clause 13B. The method of any of clauses 7B-12B, wherein obtaining the prediction block comprises determining the prediction block based on a linear combination of prediction blocks for two motion vector candidates in the list of motion vector candidates.

Clause 14B. The method of any of clauses 7B-12B, wherein obtaining the prediction block comprises, based on costs of two motion vector candidates in the list of motion vector candidates being less than a threshold, determining the prediction block based on a linear combination of prediction blocks for the two motion vector candidates.

Clause 15B. The method of any of clauses 7B-14B, wherein a syntax element indicates whether the two or more reference templates are selected.

Clause 16B. The method of any of clauses 1B-15B, wherein obtaining the prediction block for the current block comprises: generating a first prediction block using the reference template; generating a second prediction block using a motion vector candidate; and generating the prediction block for the current block based on the first prediction block and the second prediction block.

Clause 17B. The method of any of clauses 1B-16B, wherein: the template pattern is a first template pattern, the reference template is a first reference template, and the current template is a first current template, obtaining the prediction block for the current block comprises: generating a first prediction block using the first reference template; identifying a second reference template based on a similarity of the second reference template and a second current template, wherein the second reference template and the second current template have a shape defined by a second template pattern different from the first template pattern, the second reference template includes second previously reconstructed samples and the second current template includes second reference samples of the current block; generating a second prediction block using the second reference template; and generating the prediction block for the current block based on the first prediction block and the second prediction block.

Clause 18B. The method of clause 17B, wherein generating the prediction block for the current block comprises: determining a weight for the first prediction block and a weight for the second prediction block based on template matching costs of the first reference template and the second reference template; and generating samples of the prediction block for the current block as a combination of samples of the first prediction block and the second prediction block weighted according to the weight for the first prediction block and the weight for the second prediction block.

Clause 19B. A device for coding video data, the device comprising: a memory configured to store the video data; and one or more processors implemented in circuitry, the one or more processors configured to: determine a template pattern from among a set of two or more template patterns; identify a reference template based on a similarity of the reference template and a current template, wherein the reference template and the current template have a shape defined by the template pattern, the reference template includes previously reconstructed samples and the current template includes reference samples of a current block of a current picture of the video data; obtain, based on the reference template, a prediction block for the current block; and encode or decode the current block based on the prediction block.

Clause 20B. The device of clause 19B, wherein the set of two or more template patterns includes a base template pattern and one or more additional template patterns that fit within a region of the base template pattern.

Clause 21B. The device of clause 20B, wherein the one or more processors are configured to, as part of identifying the reference template: determine a cost for the base template pattern; and determine costs of the additional template patterns based on costs of subregions within the region of the base template pattern.

Clause 22B. The device of any of clauses 20B-21B, wherein a template having a shape defined by the base template pattern includes reference samples above and left of the current block.

Clause 23B. The device of any of clauses 19B-22B, wherein the one or more processors are further configured to signal one or more syntax elements that identify the template pattern.

Clause 24B. The device of any of clauses 19B-23B, wherein: the one or more processors are further configured to obtain, from a bitstream that includes an encoded representation of the video data, one or more syntax elements that indicate the template pattern; and the one or more processors are configured to, as part determining the template pattern, determine the template pattern based on the one or more syntax elements.

Clause 25B. The device of any of clauses 19B-24B, wherein: the reference template is a first reference template, and the one or more processors are further configured to: generate a list of motion vector candidates, wherein the one or more processors are configured to, as part of generating the list of motion vector candidates: determine template matching costs for reference templates in a plurality of reference templates, wherein each reference template in the plurality of reference templates has the shape defined by the template pattern; select two or more of the reference templates based on the template matching costs for the reference templates, wherein the selected reference templates include the first reference template; and include candidates indicating motion vectors of the selected reference templates in the list of motion vector candidates, determine a selected motion vector in the list of motion vector candidates, wherein the selected motion vector is the motion vector of the first reference template; and use the selected motion vector to determine a location of the prediction block for the current block.

Clause 26B. The device of clause 25B, wherein the one or more processors are configured to, as part of generating the list of motion vector candidates, perform at least one of: excluding a motion vector of a reference template from the list of motion vector candidates based on a comparison of a distance of the motion vector of the reference template and a temporary best candidate motion vector in the list of motion vector candidates, excluding a motion vector of a reference template from the list of motion vector candidates based on a comparison of a difference between a prediction block of a reference template and a prediction block of a temporary best candidate motion vector in the list of motion vector candidates, or removing, from the list of motion vector candidates, a candidate that indicates a motion vector of a first one of the selected reference templates based on a comparison of a predefined threshold and a difference of the cost of the first selected reference template and the cost of a second selected reference template.

Clause 27B. The device of any of clauses 25B-26B, wherein: the reference template is a first reference template, and the one or more processors are configured to, as part of obtaining the prediction block: determine a first prediction block based on the first reference template; determine a second prediction block based on a second reference template, wherein the shape of the first reference template and a shape of the second reference template are defined by the template pattern; and generate the prediction block for the current block based on the first prediction block and the second prediction block.

Clause 28B. The device of clause 27B, wherein the one or more processors are configured to, as part of generating the prediction block for the current block: determine a weight for the first prediction block based on a template matching cost of the first reference template; determine a weight for the second prediction block based on a template matching cost of the second reference template; and generate samples of the prediction block for the current block as a combination of samples of the first prediction block and the second prediction block weighted according to the weight for the first prediction block and the weight for the second prediction block.

Clause 29B. The device of clause 28B, wherein: the one or more processors are configured to, as part of determining the weight for the first prediction block, determine the weight for the first prediction block based on a multiplicative inverse of the template matching cost of the first reference template, and the one or more processors are configured to, as part of determining the weight for the second prediction block, determine the weight for the second prediction block based on a multiplicative inverse of the template matching cost of the second reference template.

Clause 30B. The device of any of clauses 28B-29B, wherein the one or more processors are configured to, as part of determining the weight for the first prediction block, perform at least one of: setting the weight for the first prediction block to 0 based on a comparison of a predefined threshold and a distance of the motion vector of the first reference template and another motion vector in the list of motion vector candidates, or setting the weight for the first prediction block to 0 based on a comparison of a predetermined threshold and a difference between the first prediction block and the second prediction block.

Clause 31B. The device of any of clauses 25B-30B, wherein the one or more processors are configured to, as part of obtaining the prediction block, determine the prediction block based on a linear combination of prediction blocks for two motion vector candidates in the list of motion vector candidates.

Clause 32B. The device of any of clauses 25B-30B, wherein the one or more processors are configured to, as part of obtaining the prediction block, based on costs of two motion vector candidates in the list of motion vector candidates being less than a threshold, determine the prediction block based on a linear combination of prediction blocks for the two motion vector candidates.

Clause 33B. The device of any of clauses 25B-32B, wherein a syntax element indicates whether the two or more reference templates are selected.

Clause 34B. The device of any of clauses 19B-33B, wherein the one or more processors are configured to, as part of obtaining the prediction block for the current block: generate a first prediction block using the reference template; generate a second prediction block using a motion vector candidate; and generate the prediction block for the current block based on the first prediction block and the second prediction block.

Clause 35B. The device of any of clauses 19B-34B, wherein: the template pattern is a first template pattern, the reference template is a first reference template, and the current template is a first current template, the one or more processors are configured to, as part of obtaining the prediction block for the current block: generate a first prediction block using the first reference template; identify a second reference template based on a similarity of the second reference template and a second current template, wherein the second reference template and the second current template have a shape defined by a second template pattern different from the first template pattern, the second reference template includes second previously reconstructed samples and the second current template includes second reference samples of the current block; generate a second prediction block using the second reference template; and generate the prediction block for the current block based on the first prediction block and the second prediction block.

Clause 36B. The device of clause 35B, wherein the one or more processors are configured to, as part of generating the prediction block for the current block: determine a weight for the first prediction block and a weight for the second prediction block based on template matching costs of the first reference template and the second reference template; and generate samples of the prediction block for the current block as a combination of samples of the first prediction block and the second prediction block weighted according to the weight for the first prediction block and the weight for the second prediction block.

Clause 37. A non-transitory computer-readable storage medium having stored thereon instructions that, when executed, cause one or more processors to: determine a template pattern from among a set of two or more template patterns; identify a reference template based on a similarity of the reference template and a current template, wherein the reference template and the current template have a shape defined by the template pattern, the reference template includes previously reconstructed samples and the current template includes reference samples of a current block of a current picture of the video data; obtain, based on the reference template, a prediction block for the current block; and encode or decode the current block based on the prediction block.

It is to be recognized that depending on the example, certain acts or events of any of the techniques described herein can be performed in a different sequence, may be added, merged, or left out altogether (e.g., not all described acts or events are necessary for the of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining a template pattern from among a set of two or more template patterns;
identifying a reference template based on a similarity of the reference template and a current template, wherein the reference template and the current template have a shape defined by the template pattern, the reference template includes previously reconstructed samples and the current template includes reference samples of a current block of a current picture of the video data, wherein the set of two or more template patterns includes a base template pattern and one or more additional template patterns that fit within a region of the base template pattern, and wherein identifying the reference template comprises:
determining a cost for the base template pattern;
determining one or more costs of the one or more additional template patterns based on one or more subregions within the region of the base template pattern; and
identifying the reference template based on the cost for the base template pattern and the one or more costs of the one or more additional template patterns;
obtaining, based on the reference template, a prediction block for the current block; and
encoding or decoding the current block based on the prediction block.

2. The method of claim 1, wherein a template having a shape defined by the base template pattern includes reference samples above and left of the current block.

3. The method of claim 1, further comprising signaling one or more syntax elements that identify the template pattern.

4. The method of claim 1, wherein:
the method further comprises obtaining, from a bitstream that includes an encoded representation of the video data, one or more syntax elements that indicate the template pattern; and
determining the template pattern comprises determining the template pattern based on the one or more syntax elements.

5. The method of claim 1, wherein:
the reference template is a first reference template, and the method further comprises:
generating a list of motion vector candidates, wherein generating the list of motion vector candidates comprises:
determining template matching costs for reference templates in a plurality of reference templates, wherein each reference template in the plurality of reference templates has the shape defined by the template pattern;
determining, based on the template matching costs for the reference templates, two or more selected reference templates of the reference templates, wherein the selected reference templates include the first reference template; and
including candidates indicating motion vectors of the selected reference templates in the list of motion vector candidates, determining a selected motion vector in the list of motion vector candidates, wherein the selected motion vector is a motion vector of the first reference template; and
using the selected motion vector to determine a location of the prediction block for the current block.

6. The method of claim 5, wherein generating the list of motion vector candidates comprises at least one of:
excluding a motion vector of a second reference template from the list of motion vector candidates based on a comparison of a distance of the motion vector of the second reference template and a temporary best candidate motion vector in the list of motion vector candidates,
excluding a motion vector of a third reference template from the list of motion vector candidates based on a comparison of a difference between a prediction block of the third reference template and a prediction block of a temporary best candidate motion vector in the list of motion vector candidates, or
removing, from the list of motion vector candidates, a candidate that indicates a motion vector of the first reference template based on a comparison of a predefined threshold and a difference of a cost of the first reference template and the cost of a second selected reference template, wherein the selected reference templates further includes the second selected reference template.

7. The method of claim 5, wherein
obtaining the prediction block for the current block comprises:
determining a first prediction block based on the first reference template;
determining a second prediction block based on a second reference template, wherein the shape of the first reference template and a shape of the second reference template are defined by the template pattern; and
generating the prediction block for the current block based on the first prediction block and the second prediction block.

8. The method of claim 7, wherein generating the prediction block for the current block comprises:
determining a weight for the first prediction block based on a template matching cost of the first reference template;
determining a weight for the second prediction block based on a template matching cost of the second reference template; and
generating samples of the prediction block for the current block as a combination of samples of the first prediction block and samples of the second prediction block weighted according to the weight for the first prediction block and the weight for the second prediction block.

9. The method of claim 8, wherein:
determining the weight for the first prediction block comprises determining the weight for the first prediction block based on a multiplicative inverse of the template matching cost of the first reference template, and
determining the weight for the second prediction block comprises determining the weight for the second prediction block based on a multiplicative inverse of the template matching cost of the second reference template.

10. The method of claim 8, wherein determining the weight for the first prediction block comprises at least one of:

setting the weight for the first prediction block to 0 based on a comparison of a predefined threshold and a distance of the motion vector of the first reference template and another motion vector in the list of motion vector candidates, or setting the weight for the first prediction block to 0 based on a comparison of a predetermined threshold and a difference between the first prediction block and the second prediction block.

11. The method of claim 5, wherein obtaining the prediction block comprises determining the prediction block based on a linear combination of prediction blocks for two motion vector candidates in the list of motion vector candidates.

12. The method of claim 5, wherein obtaining the prediction block comprises, based on costs of two motion vector candidates in the list of motion vector candidates being less than a threshold, determining the prediction block based on a linear combination of prediction blocks for the two motion vector candidates.

13. The method of claim 5, wherein a syntax element indicates whether the selected reference templates are selected.

14. The method of claim 1, wherein obtaining the prediction block for the current block comprises:

generating a first prediction block using the reference template;

generating a second prediction block using a motion vector candidate; and generating the prediction block for the current block based on the first prediction block and the second prediction block.

15. The method of claim 1, wherein:

the template pattern is a first template pattern, the reference template is a first reference template, and the current template is a first current template, obtaining the prediction block for the current block comprises:

generating a first prediction block using the first reference template;

identifying a second reference template based on a similarity of the second reference template and a second current template, wherein the second reference template and the second current template have a shape defined by a second template pattern different from the first template pattern, the second reference template includes second previously reconstructed samples and the second current template includes second reference samples of the current block;

generating a second prediction block using the second reference template; and generating the prediction block for the current block based on the first prediction block and the second prediction block.

16. The method of claim 15, wherein generating the prediction block for the current block comprises:

determining a weight for the first prediction block and a weight for the second prediction block based on template matching costs of the first reference template and the second reference template; and generating samples of the prediction block for the current block as a combination of samples of the first prediction block and the second prediction block weighted according to the weight for the first prediction block and the weight for the second prediction block.

17. A device for coding video data, the device comprising:
a memory configured to store the video data; and
one or more processors implemented in circuitry, the one or more processors configured to:

determine a template pattern from among a set of two or more template patterns;

identify a reference template based on a similarity of the reference template and a current template, wherein the reference template and the current template have a shape defined by the template pattern, the reference template includes previously reconstructed samples and the current template includes reference samples of a current block of a current picture of the video data, wherein the set of two or more template patterns includes a base template pattern and one or more additional template patterns that fit within a region of the base template pattern, and wherein to identify the reference template, the one or more processors are configured to:

determine a cost for the base template pattern;

determine one or more costs of the one or more additional template patterns based on one or more subregions within the region of the base template pattern; and identify the reference template based on the cost for the base template pattern and the one or more costs of the one or more additional template patterns;

obtain, based on the reference template, a prediction block for the current block; and encode or decode the current block based on the prediction block.

18. The device of claim 17, wherein a template having a shape defined by the base template pattern includes reference samples above and left of the current block.

19. The device of claim 17, wherein the one or more processors are further configured to signal one or more syntax elements that identify the template pattern.

20. The device of claim 17, wherein:

the one or more processors are further configured to obtain, from a bitstream that includes an encoded representation of the video data, one or more syntax elements that indicate the template pattern; and the one or more processors are configured to, as part determining the template pattern, determine the template pattern based on the one or more syntax elements.

21. The device of claim 17, wherein:

the reference template is a first reference template, and the one or more processors are further configured to:

generate a list of motion vector candidates, wherein the one or more processors are configured to, as part of generating the list of motion vector candidates:

determine template matching costs for reference templates in a plurality of reference templates, wherein each reference template in the plurality of reference templates has the shape defined by the template pattern;

determine, based on the template matching costs for the reference templates, two or more selected reference templates of the reference templates, wherein the selected reference templates include the first reference template; and include candidates indicating motion vectors of the selected reference templates in the list of motion vector candidates, determine a selected motion vector in the list of motion vector candidates, wherein the selected motion vector is a motion vector of the first reference template; and use the selected motion vector to determine a location of the prediction block for the current block.

22. The device of claim 21, wherein the one or more processors are configured to, as part of generating the list of motion vector candidates, perform at least one of:

excluding a motion vector of a second reference template from the list of motion vector candidates based on a comparison of a distance of the motion vector of the second reference template and a temporary best candidate motion vector in the list of motion vector candidates, excluding a motion vector of a third reference template from the list of motion vector candidates based on a comparison of a difference between a prediction block of the reference template and a prediction block of a temporary best candidate motion vector in the list of motion vector candidates, or removing, from the list of motion vector candidates, a candidate that indicates a motion vector of a first one of the selected reference templates based on a comparison of a predefined threshold and a difference of a cost of the first reference template and the cost of a second selected reference template, wherein the selected reference templates further includes the second selected reference template.

23. The device of claim 21, wherein the one or more processors are configured to, as part of obtaining the prediction block for the current block:

determine a first prediction block based on the first reference template;

determine a second prediction block based on a second reference template, wherein the shape of the first reference template and a shape of the second reference template are defined by the template pattern; and generate the prediction block for the current block based on the first prediction block and the second prediction block.

24. The device of claim 23, wherein the one or more processors are configured to, as part of generating the prediction block for the current block:

determine a weight for the first prediction block based on a template matching cost of the first reference template;

determine a weight for the second prediction block based on a template matching cost of the second reference template; and generate samples of the prediction block for the current block as a combination of samples of the first prediction block and samples of the second prediction block weighted according to the weight for the first prediction block and the weight for the second prediction block.

25. The device of claim 24, wherein:

the one or more processors are configured to, as part of determining the weight for the first prediction block, determine the weight for the first prediction block based on a multiplicative inverse of the template matching cost of the first reference template, and the one or more processors are configured to, as part of determining the weight for the second prediction block, determine the weight for the second prediction block based on a multiplicative inverse of the template matching cost of the second reference template.

26. The device of claim 24, wherein the one or more processors are configured to, as part of determining the weight for the first prediction block, perform at least one of:

setting the weight for the first prediction block to 0 based on a comparison of a predefined threshold and a distance of the motion vector of the first reference template and another motion vector in the list of motion vector candidates, or setting the weight for the first prediction block to 0 based on a comparison of a predetermined threshold and a difference between the first prediction block and the second prediction block.

27. The device of claim 21, wherein the one or more processors are configured to, as part of obtaining the prediction block, determine the prediction block based on a linear combination of prediction blocks for two motion vector candidates in the list of motion vector candidates.

28. The device of claim 21, wherein the one or more processors are configured to, as part of obtaining the prediction block, based on costs of two motion vector candidates in the list of motion vector candidates being less than a threshold, determine the prediction block based on a linear combination of prediction blocks for the two motion vector candidates.

29. The device of claim 21, wherein a syntax element indicates whether the selected reference templates are selected.

30. The device of claim 17, wherein the one or more processors are configured to, as part of obtaining the prediction block for the current block:

generate a first prediction block using the reference template;

generate a second prediction block using a motion vector candidate; and generate the prediction block for the current block based on the first prediction block and the second prediction block.

31. The device of claim 17, wherein:

the template pattern is a first template pattern, the reference template is a first reference template, and the current template is a first current template, the one or more processors are configured to, as part of obtaining the prediction block for the current block:

generate a first prediction block using the first reference template;

identify a second reference template based on a similarity of the second reference template and a second current template, wherein the second reference template and the second current template have a shape defined by a second template pattern different from the first template pattern, the second reference template includes second previously reconstructed samples and the second current template includes second reference samples of the current block;

generate a second prediction block using the second reference template; and generate the prediction block for the current block based on the first prediction block and the second prediction block.

32. The device of claim 31, wherein the one or more processors are configured to, as part of generating the prediction block for the current block:

determine a weight for the first prediction block and a weight for the second prediction block based on template matching costs of the first reference template and the second reference template; and 51 52 generate samples of the prediction block for the current
block as a combination of samples of the first predic-
tion block and samples of the second prediction block
weighted according to the weight for the first prediction
block and the weight for the second prediction block.

33. A method of coding video data, the method compris-
ing:

determining a template pattern from among a set of two
or more template patterns;

identifying a first reference template based on a similarity
of the first reference template and a current template,
wherein the first reference template and the current
template have a shape defined by the template pattern,
the first reference template includes previously recon-
structed samples and the current template includes
reference samples of a current block of a current picture
of the video data;

generating a list of motion vector candidates, wherein
generating the list of motion vector candidates com-
prises:

determining template matching costs for reference tem-
plates in a plurality of reference templates, wherein
each reference template in the plurality of reference
templates has the shape defined by the template
pattern;

determining two or more selected reference templates
of the reference templates based on the template
matching costs for the reference templates, wherein
the selected reference templates include the first
reference template; and including candidates indicating motion vectors of the
selected reference templates in the list of motion
vector candidates, determining a selected motion vector in the list of
motion vector candidates, wherein the selected
motion vector is a motion vector of the first reference
template; and using the selected motion vector to determine a location
of a prediction block for the current block;

obtaining, based on the first reference template, the pre-
diction block for the current block, wherein obtaining
the prediction block comprises:

determining a first prediction block based on the first
reference template;

determining a second prediction block based on a
second reference template, wherein the shape of the
first reference template and a shape of the second
reference template are defined by the template pat-
tern; and generating the prediction block for the current block
based on the first prediction block and the second
prediction block, wherein generating the prediction
block for the current block comprises:

determining a weight for the first prediction block
based on a template matching cost of the first
reference template, wherein determining the
weight for the first prediction block comprises at
least one of:

setting the weight for the first prediction block to
0 based on a comparison of a predefined thresh-
old and a distance of the motion vector of the
first reference template and another motion vec-
tor in the list of motion vector candidates, or setting the weight for the first prediction block to
0 based on a comparison of a predetermined
threshold and a difference between the first
prediction block and the second prediction
block;

determining a weight for the second prediction block
based on a template matching cost of the second
reference template; and generating samples of the prediction block for the
current block as a combination of samples of the
first prediction block and the second prediction
block weighted according to the weight for the
first prediction block and the weight for the second
prediction block; and encoding or decoding the current block based on the
prediction block.

* * * * *